US012299008B2

(12) United States Patent
Shamdasani et al.

(10) Patent No.: US 12,299,008 B2
(45) Date of Patent: May 13, 2025

(54) USER INTERFACE FEATURES FOR MULTI-PRODUCT REPORT

(71) Applicant: Ramp Business Corporation, New York, NY (US)

(72) Inventors: Samay Shamdasani, New York, NY (US); Paul Sauve, New York, NY (US); Eric Eriksson, New York, NY (US)

(73) Assignee: Ramp Business Corporation, New York, NY (US)

( * ) Notice: Subject to any disclaimer, the term of this patent is extended or adjusted under 35 U.S.C. 154(b) by 55 days.

(21) Appl. No.: 18/163,533

(22) Filed: Feb. 2, 2023

(65) Prior Publication Data

US 2024/0265035 A1 Aug. 8, 2024

(51) Int. Cl.
*G06F 16/28* (2019.01)
*G06F 16/2458* (2019.01)

(52) U.S. Cl.
CPC ........ *G06F 16/287* (2019.01); *G06F 16/2477* (2019.01)

(58) Field of Classification Search
CPC ............................ G06F 16/287; G06F 16/2477
See application file for complete search history.

(56) References Cited

U.S. PATENT DOCUMENTS

| | | | | |
|---|---|---|---|---|
| 2007/0265999 | A1* | 11/2007 | Amitay | G06F 16/951 |
| 2012/0131036 | A1* | 5/2012 | Averbuch | G06F 16/283 |
| | | | | 715/764 |
| 2016/0093075 | A1* | 3/2016 | Kuroda | G06F 16/24564 |
| | | | | 345/440 |
| 2018/0165347 | A1* | 6/2018 | Fitzpatrick | G06F 16/258 |
| 2018/0189356 | A1* | 7/2018 | Ghafourifar | G06F 16/24575 |
| 2019/0034951 | A1* | 1/2019 | Cole | G06Q 10/06393 |
| 2024/0095743 | A1* | 3/2024 | Tiwari | G06Q 20/4016 |

OTHER PUBLICATIONS

Marcus et al., TwitInfo: Aggregating and Visualizing Microblogs for Event Exploration, CHI 2011, May 7-12, 2011, Vancouver, BC, Canada, pp. 227-236. (Year: 2011).*
Weaver, C., Cross-Filtered Views for Multidimensional Visual Analysis, IEEE Transactions On Visualization and Computer Graphics, vol. 16, No. 2, Mar./Apr. 2010, pp. 192-204. (Year: 2010).*

\* cited by examiner

*Primary Examiner* — Cheyne D Ly
(74) *Attorney, Agent, or Firm* — Fenwick & West LLP

(57) ABSTRACT

A method for generating a multi-dimensional data report. The method includes generating a first set of data through the authorizations, and receiving a second set of data. The method includes displaying a GUI that visualizes an aggregation of the first set of data and the second set of data as a two-dimensional temporal graph. The method further includes receiving a filtering selection, filtering the aggregation of data by a first dimension to generate a first subset of data, and receiving a grouping selection to group the first subset of the data by a second dimension. The two-dimensional temporal graph includes accumulative information of the first subset of data that is separated by a plurality of second-dimensional values, each second-dimensional value of the second dimension is associated with a visual element that is distinguishable from other second-dimensional values, and a totality of the plurality of second-dimensional values forms the accumulative information.

20 Claims, 11 Drawing Sheets

USER INTERFACE FEATURES FOR MULTI-PRODUCT REPORT

TECHNICAL FIELD

The present disclosure generally relates to report and presentation of data records and, particularly, report and presentation of data records with multiple dimensional information.

BACKGROUND

Data is a valuable, powerful asset for organizations. However, big data with large volumes and complexities don't always drive actionable insights. Especially for multi-dimensional data, the more dimensions the data has, the harder it is to analyze with traditional methods. For example, trillions of transactions are made daily, and the records of those transactions can contain data that includes different dimensions, i.e., features or attributes. The data may also lack a standard protocol or format, leading to transaction data to appear noisy for a receiving party who does not have full information of data schemas and structures used. The traditional data analysis and communication is typically restricted to two dimensions. Thus, an improved method for presenting and analyzing the multi-dimensional data is needed.

SUMMARY

Embodiments are related to a process for generating a multi-dimensional data report. The method includes serving as a server that manages authorizations on behalf of a domain, generating a first set of data through the authorizations, and storing the first set of data as multi-dimensional data that comprises a plurality of dimensions. The plurality of dimensions includes the user accounts and the third-party named entities as two of the dimensions. The process further includes receiving a second set of data from one or more external data sources. The process includes displaying a graphical user interface that visualizes an aggregation of the first set of data and the second set of data as a two-dimensional temporal graph, receiving a filtering selection of the aggregation of data by a first dimension, filtering the aggregation of data by the first dimension to generate a first subset of data, and receiving a grouping selection to group the first subset of the data by a second dimension. The second dimension of the first subset of data includes a plurality of second-dimensional values. The process further includes displaying the two-dimensional temporal graph in the graphical user interface. The two-dimensional temporal graph includes accumulative information of the first subset of data that is separated by the plurality of second-dimensional values, each second-dimensional value of the second dimension is associated with a visual element that is distinguishable from other second-dimensional values, and a totality of the plurality of second-dimensional values forms the accumulative information.

Embodiments are further related to a system for generating a multi-dimensional data report. The system includes a graphical user interface configured to display a two-dimensional temporal graph; and a computing server in communication with the graphical user interface. The computing server includes a processor and memory, and the memory is configured to store a set of code instructions. The set of code instructions, when executed by the processor, causes the processor to serve as a server that manages authorizations on behalf of a domain, generate a first set of data through the authorizations, and store the first set of data as multi-dimensional data that comprises a plurality of dimensions. The plurality of dimensions includes the user accounts and the third-party named entities as two of the dimensions. The set of code instruction further causes the processor to receive a second set of data from one or more external data sources, and display a graphical user interface that visualizes an aggregation of the first set of data and the second set of data as a two-dimensional temporal graph. The set of code instruction further causes the processor to receive a filtering selection of the aggregation of data by a first dimension, filter the aggregation of data by the first dimension to generate a first subset of data, and receive a grouping selection to group the first subset of the data by a second dimension. The second dimension of the first subset of data includes a plurality of second-dimensional values. The set of code instruction further causes the processor to display the two-dimensional temporal graph in the graphical user interface. The two-dimensional temporal graph includes accumulative information of the first subset of data that is separated by the plurality of second-dimensional values, each second-dimensional value of the second dimension is associated with a visual element that is distinguishable from other second-dimensional values, and a totality of the plurality of second-dimensional values forms the accumulative information.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

Figure 1:
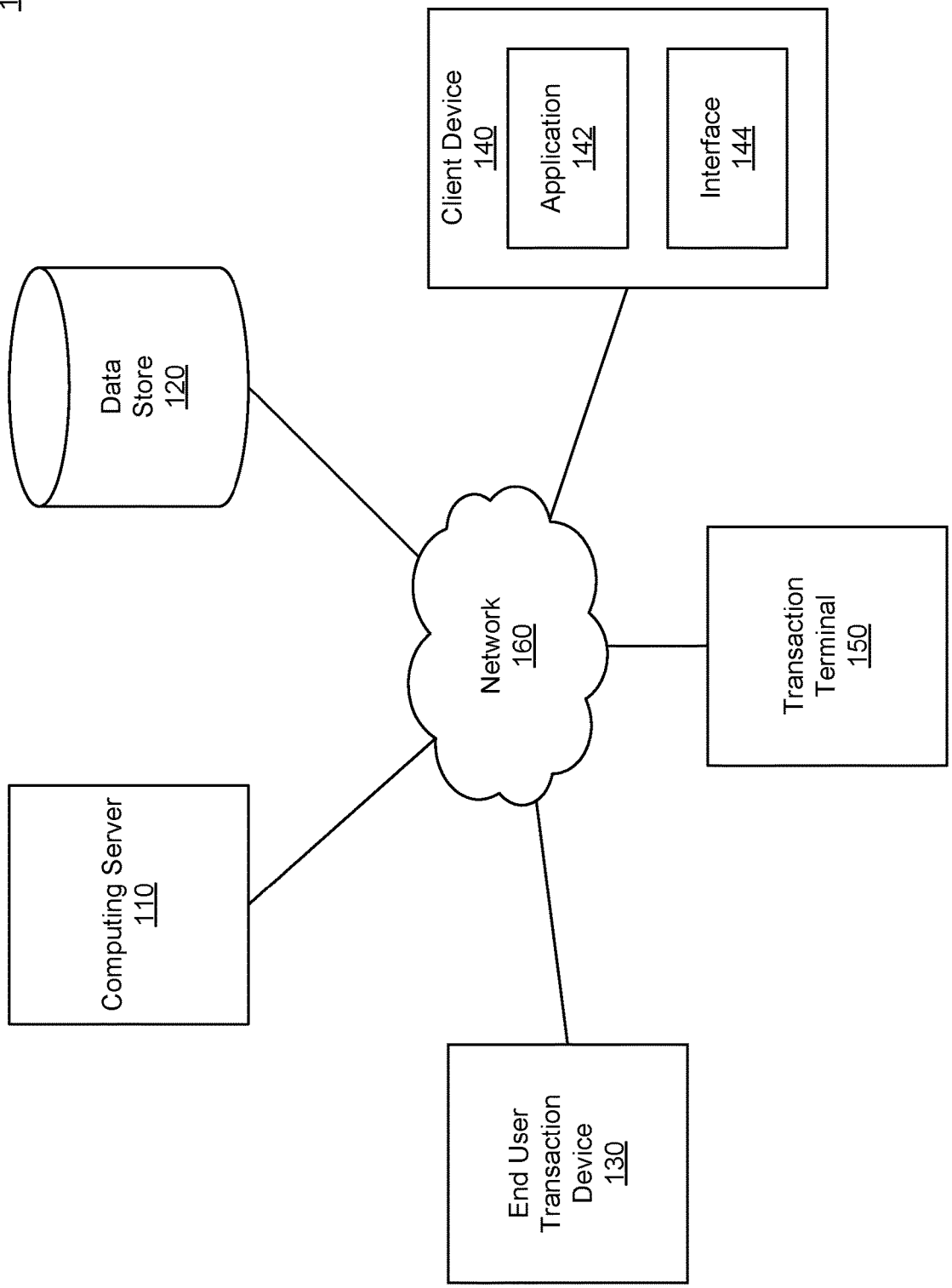
FIG. 1 is a block diagram illustrating an example system environment, in accordance with an embodiment.

FIG. 1 is a block diagram that illustrates a data management system environment 100, in accordance with an embodiment. The system environment 100 includes a computing server 110, a data store 120, an end user transaction device 130, a client device 140, and a transaction terminal 150. The entities and components in the system environment 100 communicate with each other through a network 160. In various embodiments, the system environment 100 includes fewer or additional components. In some embodiments, the system environment 100 also includes different components. While each of the components in the system environment 100 is described in a singular form, the system environment 100 may include one or more of each of the components. For example, in many situations, the computing server 110 can issue multiple end user transaction devices 130 for different end users. Different client devices 140 may also access the computing server 110 simultaneously.

The computing server 110 includes one or more computers that perform various tasks related to visualization of data and management of transactions of various clients of the computing server 110. For example, the computing server 110 creates credit cards and accounts for an organization client and manages transactions of the cards of the organization client based on rules set by the client (e.g., pre-authorization and restrictions on certain transactions). The computing server 110 aggregates the corresponding transaction data and renders visualization of the data in a multi-dimension dimension fashion. The computing server 110 may manage a platform, such as an online platform, to provide summary of transactions and visualization of data for various of its organization clients in manners that will be discussed in further below. Examples of organizations may include commercial businesses, educational institutions, private or government agencies, or any suitable group of one or more individuals that engage in transactions with a named entity (e.g., a merchant) using an account associated with a credit card. In some embodiments, a named entity may be an identifiable real-world entity that may be detectable in data of an organization. For example, a specific merchant may be a named entity that provides goods or services for purchase by end users through a transaction terminal 150. An end user may be a member of an organization client such as an employee of the organization or an individual that uses the end user transaction device 130 to make purchase from a named entity. In one embodiment, the computing server 110 provides its clients with various transaction management services and data visualization tool as a form of cloud-based software, such as software as a service (SaaS).

In some embodiments, the computing server 110 may be a server that manages authorizations on behalf of a domain. The computing server 110 may generate a set of data through authorizations. The set of data may include authorization records between user accounts of the domain and the named entities. For example, the authorization records may include transaction records, payment records, etc. In some embodiments, the computing server 110 may receive data from one or more external data sources such as transaction terminals 150 or third-party servers. In some embodiments, the received data may be electronic fund transfers, payments records, credit card transaction records, etc. In some embodiments, the computing server 110 may aggregate the generated data and the received data to produce an aggregated set of data. The aggregated data may be used to generate a data report upon request. Examples of components and functionalities of the computing server 110 are discussed in further detail below with reference to FIG. 2. The computing server 110 may provide a SaaS platform for various clients to manage their accounts and transaction rules related to the accounts.

A domain refers to an environment in which a system operates and/or an environment for a group of units and individuals to use common domain knowledge to organize activities, information and entities related to the domain in a specific way. An example of a domain is an organization, such as a business, an institute, or a subpart thereof and the data within it. A domain can be associated with a specific domain knowledge ontology, which could include representations, naming, definitions of categories, properties, logics, and relationships among various concepts, data, transactions, and entities that are related to the domain. The boundary of a domain may not completely overlap with the boundary of an organization. For example, a domain may be a subsidiary of a company. Various divisions or departments of the organization may have their own definitions, internal procedures, tasks, and entities. In other situations, multiple organizations may share the same domain.

The data store 120 includes one or more computing devices that include memory or other storage media for storing various files and data of the computing server 110. The data stored in the data store 120 includes accounting information, transaction data, credit card profiles, card rules and restrictions, merchant profiles, merchant identification rules, documentation records, record verification rules, and other related data associated with various clients of the computing server 110. In some embodiments, the set of data that is generated by the computing server 110 though authorizations may be stored in the data store 120. The set of data may be stored as a multi-dimensional data that includes a plurality of dimensions. For example, a transaction dataset may include multiple dimensions such as the user account associated with the transaction, third-parity named entity involved in the transaction (e.g., the merchant entity in a credit card transaction), other suitable metadata of the transaction, etc.

In various embodiments, the data store 120 may take different forms. In one embodiment, the data store 120 is part of the computing server 110. For example, the data store 120 is part of the local storage (e.g., hard drive, memory card, data server room) of the computing server 110. In some embodiments, the data store 120 is a network-based storage server (e.g., a cloud server). The data store 120 may be a third-party storage system such as AMAZON AWS, DROPBOX, RACKSPACE CLOUD FILES, AZURE BLOB STORAGE, GOOGLE CLOUD STORAGE, etc. The data in the data store 120 may be structured in different database formats such as a relational database using the structured query language (SQL) or other data structures such as a non-relational format, a key-value store, a graph structure, a linked list, an object storage, a resource description framework (RDF), etc. In one embodiment, the data store 120 uses various data structures mentioned above.

An end user transaction device 130 is a device that enables the holder of the device 130 to perform a transaction with a party (e.g., a named entity), such as making a payment to a merchant for goods and services based on information and credentials stored at the end user transaction device 130. An end user transaction device 130 may also be referred to as an end user payment device. Examples of end user transaction devices 130 include payment cards such as credit cards, debit cards, and prepaid cards, other smart cards with chips such as radio frequency identification (RFID) chips, portable electronic devices such as smart phones that enable payment methods such as APPLE PAY or GOOGLE PAY, portable electronic devices that store one or more virtual credit cards, and wearable electronic devices. The computing server 110 issues accounts associated with the end user transaction devices 130. For example, the computing server 110 may issue accounts for virtual credit cards for its organization clients. While credit cards are often used as examples in the discussion of this disclosure, various architectures and processes described herein may also be applied to other types of end user transaction devices 130. In some cases, an end user transaction device 130 may also be a virtual device such as a virtual credit card.

A client device 140 is a computing device that belongs to a client of the computing server 110. A client uses the client device 140 to communicate with the computing server 110 and performs various payment and spending management related tasks such as creating credit cards and associated payment accounts, setting transaction and record verification rules and restrictions on cards, setting pre-authorized or prohibited merchants or merchant categories (e.g., entertainment, travel, education, health, etc.), and managing transactions and records (e.g., verifying a documentation record). The user of the client device 140 may be a manager, an accounting administrator, or a general employee of an organization. While in this disclosure a client is often described as an organization, a client may also be a natural person or a robotic agent. A client may be referred to an organization or its representative such as its employee.

A client device 140 includes one or more applications 142 and interfaces 144 that may display visual elements of the applications 142. The client device 140 may be any computing device. Examples of such client devices 140 include personal computers (PC), desktop computers, laptop computers, tablets (e.g., iPADs), smartphones, wearable electronic devices such as smartwatches, or any other suitable electronic devices.

The application 142 is a software application that operates at the client device 140. In one embodiment, an application 142 is published by the party that operates the computing server 110 to allow clients to communicate with the computing server 110. For example, the application 142 may be part of a SaaS platform of the computing server 110 that allows a client to create credit cards and accounts and perform various payment and spending management tasks (e.g., confirm documentation records have been verified). In various embodiments, an application 142 may be of different types. In one embodiment, an application 142 is a web application that runs on JavaScript and other backend algorithms. In the case of a web application, the application 142 cooperates with a web browser to render a front-end interface 144. In another embodiment, an application 142 is a mobile application. For example, the mobile application may run on Swift for iOS and other APPLE operating systems or on Java or another suitable language for ANDROID systems. In yet another embodiment, an application 142 may be a software program that operates on a desktop computer that runs on an operating system such as LINUX, MICROSOFT WINDOWS, MAC OS, or CHROME OS.

An interface 144 is a suitable interface for a client to interact with the computing server 110. The client may communicate to the application 142 and the computing server 110 through the interface 144. The interface 144 may take different forms. In one embodiment, the interface 144 may be a web browser such as CHROME, FIREFOX, SAFARI, INTERNET EXPLORER, EDGE, etc. and the application 142 may be a web application that is run by the web browser. In one embodiment, the interface 144 is part of the application 142. For example, the interface 144 may be the front-end component of a mobile application or a desktop application. In one embodiment, the interface 144 also is a graphical user interface which includes graphical elements and user-friendly control elements.

In one embodiment, the interface 144 may include a graphical user interface that visualizes data as a two-dimensional temporal graph. The interface 144 may further include one or more user interactive elements, such as filtering, grouping, etc. so that a user may filter and/or group a subset of data for display in the interface 144. In one example, the filtered and/or grouped data may be displayed by the interface 144 in a two-dimensional temporal graph, which includes accumulative information of the data. The data may be further separated by a plurality of values in a selected dimension. Each value of the selected dimension is associated with a visual element that is distinguishable from other values. A totality of the plurality of the values of the selected dimension forms the accumulative information of the data. Examples of the interface 144 are discussed in further detail below with reference to FIG. 4A to FIG. 9.

In some embodiments, the client device 140 and the end user transaction device 130 belong to the same domain. For example, a company client can request the computing server 110 to issue multiple company credit cards for the employees. In other embodiments, the client device 140 and the end user transaction device 130 may be controlled by individuals who are unrelated.

A transaction terminal 150 is an interface that allows an end user transaction device 130 to make electronic fund transfers with a third party such as a third-party named entity. Electronic fund transfer can be credit card payments, automated teller machine (ATM) transfers, direct deposits, debits, online transfers, peer-to-peer transactions such as VENMO, instant-messaging fund transfers such as FACEBOOK PAY and WECHAT PAY, wire transfer, electronic bill payment, automated clearing house (ACH) transfer, cryptocurrency transfer, blockchain transfer, etc. Depending on the type of electronic fund transfers, a transaction terminal 150 may take different forms. For example, if an electronic fund transfer is a credit card payment, the transaction terminal 150 can be a physical device such as a point of sale (POS) terminal (e.g., a card terminal) or can be a website for online orders. An ATM, a bank website, a peer-to-peer mobile application, and an instant messaging application can also be examples of a transaction terminal 150. The third party is a transferor or transferee of the fund transfer. For example, in a card transaction, the third party may be a named entity (e.g., a merchant). In an electronic fund transfer such as a card payment for a merchant, the transaction terminal 150 may generate a transaction data payload that carries information related to the end user transaction device 130, the merchant, and the transaction. The transaction data payload is transmitted to other parties, such as credit card companies or banks, for approval or denial of the transaction. Transaction may also be recorded manually or performed via instruments such as ACH, wire, check, etc. The transaction terminal in such a case may be a computing device.

In various embodiments, a named entity such as a merchant may automatically generate a documentation record to document an occurred transaction. The documentation record, which may also simply be referred to as a record, may be generated by the transaction terminal 150 or a server of the named entity. A documentation record serves as a record of a transaction between a named entity and an end user. For example, after a purchase using a POS terminal, the terminal (which broadly may mean the terminal itself or the server of the terminal) may automatically generate a paper or email receipt for the customer. A documentation record can include the name of the named entity (e.g., the merchant), a location at which the transaction occurred, a time at which the transaction occurred, an amount which was exchanged during the transaction (e.g., an amount of currency), an itemized list of goods or services purchased, a whole or portion of an identifier of the end user transaction device 130 (e.g., the last four digits of a credit card number), any suitable data describing the transaction, or a combination thereof. The transaction terminal 150 may provide the generated documentation record to the end user transaction device 130, a computing device of the end user (e.g., a laptop computer of the end user), the computing server 110, or a combination thereof. In some embodiments, the documentation record may be included within the transaction data payload. The documentation record may take various forms, including a paper receipt, a digital image of a paper receipt, an email, a short message service (SMS) text, a Quick Response (QR) code, a physical invoice, an electronic invoice, a statement, or any suitable form for providing data describing a transaction to the end user or the computing server 110.

Various servers in this disclosure may take different forms. In one embodiment, a server is a computer that executes code instructions to perform various processes described in this disclosure. In another embodiment, a server is a pool of computing devices that may be located at the same geographical location (e.g., a server room) or be distributed geographically (e.g., clouding computing, distributed computing, or in a virtual server network). In one embodiment, a server includes one or more virtualization instances such as a container, a virtual machine, a virtual private server, a virtual kernel, or another suitable virtualization instance.

The network 160 provides connections to the components of the system environment 100 through one or more subnetworks, which may include any combination of local area and/or wide area networks, using both wired and/or wireless communication systems. In one embodiment, a network 160 uses standard communications technologies and/or protocols. For example, a network 160 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 160 may be represented using any suitable format, such as hypertext markup language (HTML), extensible markup language (XML), JavaScript object notation (JSON), structured query language (SQL). In some embodiments, some of the communication links of a network 160 may be encrypted using any suitable technique or techniques such as secure sockets layer (SSL), transport layer security (TLS), virtual private networks (VPNs), Internet Protocol security (IPsec), etc. The network 160 also includes links and packet switching networks such as the Internet. In some embodiments, a data store belongs to part of the internal computing system of a server (e.g., the data store 120 may be part of the computing server 110). In such cases, the network 160 may be a local network that enables the server to communicate with the rest of the components.

Example Server Components

Figure 2:
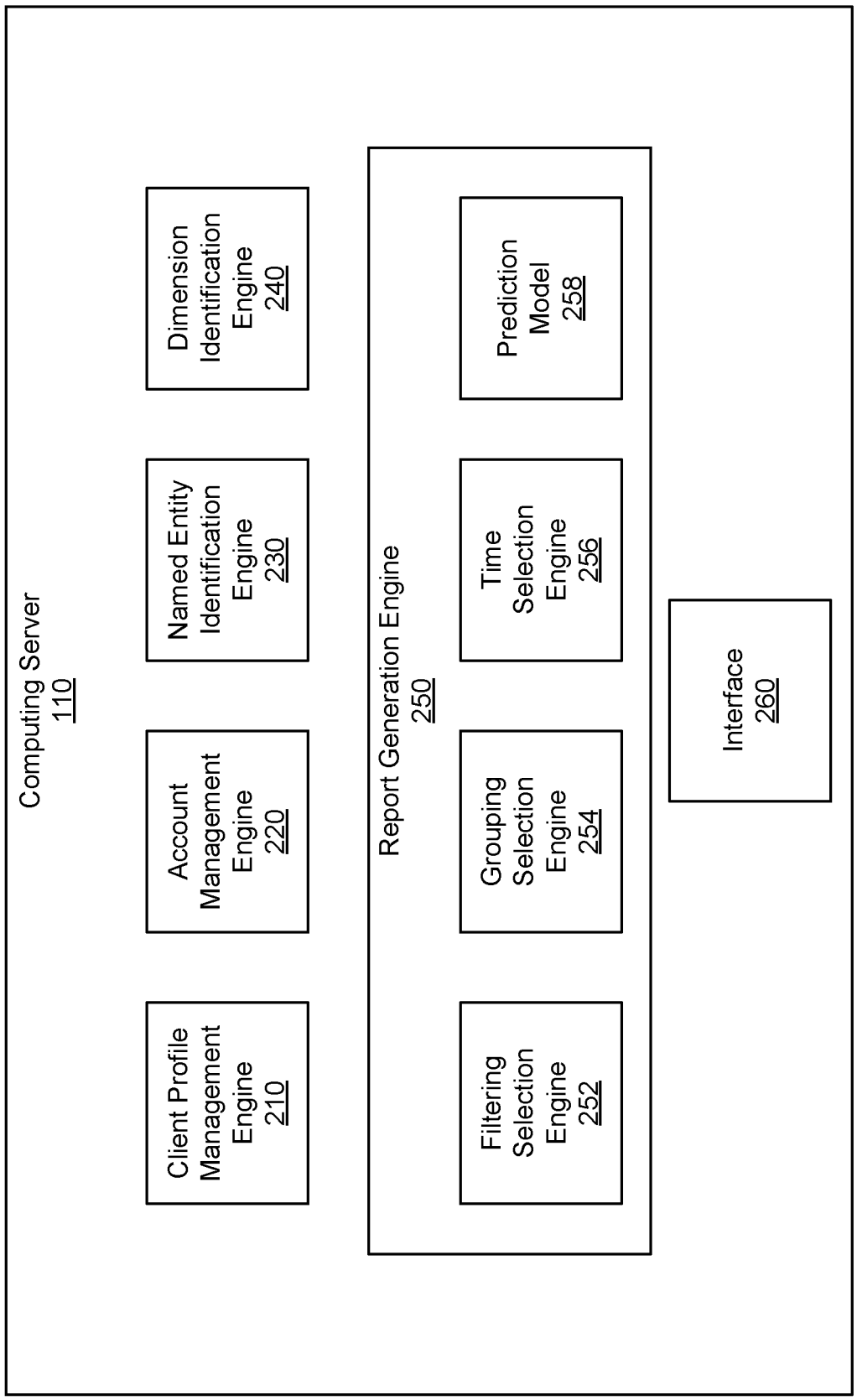
FIG. 2 includes block diagrams illustrating components of an example computing server, in accordance with an embodiment.

FIG. 2 is a block diagram illustrating components of a computing server 110, in accordance with an embodiment. The computing server 110 includes a client profile management engine 210, an account management engine 220, a named entity identification engine 230, a dimension identification engine 240, a report generation engine 250, and an interface 260. In various embodiments, the computing server 110 may include fewer or additional components. The computing server 110 also may include different components. The functions of various components may be distributed in a different manner than described below. Moreover, while each of the components in FIG. 2 may be described in a singular form, the components may present in plurality. The components may take the form of a combination of software and hardware, such as software (e.g., program code comprised of instructions) that is stored on memory and executable by a processing system (e.g., one or more processors).

The client profile management engine 210 stores and manages end user data and transaction data of clients of the computing server 110. The computing server 110 can serve various clients associated with end users such as employees, vendors, and customers. For example, the client profile management engine 210 may store the employee hierarchy of an organizational client to determine the administrative privilege of an employee in creating a credit card account and in setting transaction and record verification rules. An administrator of the client may specify that certain employees from the financial department and managers have the administrative privilege to create cards for other employees. The client profile management engine 210 assigns metadata tags to transaction data of an organization to categorize the transactions in various ways, such as by transaction types, by merchants, by date, by amount, by card, by employee groups, etc. The client profile management engine 210 can monitor the spending of a client by category and also by the total spending. The spending amounts may affect the results of transaction and record verification rules that are specified by a client's system administrator. For example, a client may limit the total monthly spending of an employee group. The computing server 110 may deny further card payments after the total spending exceeds the monthly budget.

The transaction data stored by the client profile management engine 210 can include a record of a transaction, where the record includes data such as an amount of the transaction, the date of the transaction, a named entity that accepted a request by the end user to initiate the transaction (e.g., the merchant that accepted an end user's request to purchase the merchant's service), or combination thereof. The client profile management engine 210 may store the data in a data structure and/or store the record as provided by a device of the end user or the transaction terminal 150. For example, the client profile management engine 210 may store images of receipts as taken by a camera of a computing device (e.g., smart phone) of an end user. In another example, the client profile management engine 210 may store emailed receipts as provided by a transaction terminal 150.

The account management engine 220 creates and manages accounts including payment accounts such as credit cards that are issued by the computing server 110. An account is associated with an end user such as an employee and corresponds to a card or an end user transaction device. A client may use the computing server 110 to issue domain-specific payment accounts such as company cards. The client enters account information such as the cardholder's name, role and job title of the cardholder in the client's organization, limits of the card, and transaction rules associated with the card. The client may use the client device 140 and the interface 144 to supply this information to the computing server 110. In response to receiving the account information (e.g., from the client device 140), the account management engine 220 creates the card serial number, credentials, a unique card identifier, and other information needed for the generation of a payment account and corresponding card. The account management engine 220 associates the information with the cardholder's identifier. The computing server 110 communicates with a credit card company (e.g., VISA, MASTERCARD) to associate the card account created with the identifier of the computing server 110 so that transactions related to the card will be stored at client profile management engine 210 with a mapping to identifiers for the account and the client's organization for querying transactions of the client organization. The account management engine 220 may also order the production of the physical card that is issued under the computing server 110. The cards and payment accounts created are associated with the transaction and documentation record verification rules that are specified by the client's administrator.

In some embodiments, the account management engine 220 creates rules for verifying records. A client may specify rules under which records are to be verified by the computing server 110. The client may use the interface 144 of the client device 140 to specify the rules. The rules may include a location, time, named entity, end user, account, amount (e.g., purchase amount), or any suitable parameter related to a transaction. In one example of a rule, the client specifies that a documentation record is not required to be verified for transaction amounts below 75 dollars for merchants in a travel category. In another example of a rule, the client specifies that a documentation record is required to be verified for transactions made outside of the United States. The client may specify priority for rules such that a certain rule may override another rule. For example, the account management engine 220 may determine that, under the previous two examples of rules, the client has specified that rules for requiring record verification overrides rules for not requiring verification, and verifies a documentation record for, for example, a transaction made for a train ticket in Europe using an end user transaction device issued for an end user of the client.

Upon determining that verification is or is not needed using the rules created by the account management engine 220, a record of the transaction may be annotated with an indicator for the corresponding verification requirement (e.g., verification needed or not needed). This indicator may be used when generating a user interface for the client when managing verification statuses of past transactions. Additionally, the indicator may be used to generate notifications to end users to notify the end users of the rules under which a documentation record is not necessary, which may prevent subsequent upload of records and save communication bandwidth and server storage resources. A client may establish such rules through an interface generated by the interface 260.

The named entity identification engine 230 identifies specific named entities (e.g., merchants) associated with various transactions. The computing server 110 may impose an entity-specific restriction on a card. For example, an administrator of a client may specify that a specific card can only be used with a specific named entity. The computing server 110 parses transaction data from different clients to identify patterns in the transaction data specific to certain named entities to determine whether a transaction belongs to a particular named entity. For example, in a card purchase, the transaction data includes merchant identifiers (MID), merchant category code (MCC), and the merchant name. However, those items are often insufficient to identify the actual merchant of a transaction. The MID is often an identifier that does not uniquely correspond to a merchant. In some cases, the MID is used by the POS payment terminal company such that multiple real-world merchants share the same MID. In other cases, a merchant (e.g., a retail chain) is associated with many MIDs with each branch or even each registry inside a branch having its own MID. The merchant name also suffers the same defeats as the MID. The merchant name may also include different abbreviations of the actual merchant name and sometimes misspelling. The string of the merchant name may include random numbers and random strings that are not related to the actual real-world name of the merchant. The named entity identification engine 230 applies various algorithms and machine learning models to determine the actual merchant from the transaction data. For example, the named entity identification engine 230 may search for patterns in transaction data associated with a particular merchant to determine whether a transaction belongs to the merchant. For example, a merchant may routinely insert a code in the merchant name or a store number in the merchant name. The named entity identification engine 230 identifies those patterns to parse the actual merchant name.

A named entity identification process may be used to determine the identities of named entities included in processed real-time transaction. In one embodiment, the computing server 110 determines a named entity identification rule by analyzing patterns in the volume of data associated with the plurality of clients. For example, the volume of data may include past transaction data payloads of different clients. The computing server 110 may analyze the past transaction data payloads to determine a common pattern associated with payloads of a particular named entity. The named entity identification rule may specify, for example, the location of a string, the prefix or suffix to removed, and other characteristics of the data payload. The computing server 110, upon the receipt of a transaction data payload, identifies a noisy data field in the transaction data (e.g., a noisy string of text). A noisy data field is a field that includes information more than the named entity. For example, a noisy data field may include a representation of a named entity, such as the name, an abbreviation, a nickname, a subsidiary name, or an affiliation of the named entity. The noisy data field may further include one or more irrelevant strings that may be legible but irrelevant or may even appear to be gibberish. The computing server 110 parses the representation of the named entity based on the named entity identification rule. A transaction approval process can be based on the identity of the named entity. This general framework may be used by one or more computing servers to identify named entities in transaction data payloads. U.S. patent application Ser. No. 17/351,120, entitled "Real-time Named Entity Based Transaction Approval," include additional discussion on named entity identification and is incorporated by reference herein for all purposes.

The dimension identification engine 240 identifies one or more dimensions associated with the data, e.g., transaction records. Example dimensions may include transaction amount, transaction time, merchants, time, location, amount, vendor, cardholder, category, department, payment type, card type, card program, organization team (e.g., manager, direct reports, etc.), accounting fields, etc. In some embodiments, the computing server 110 receives transaction data of credit payment and determines the dimensions that are associated with the transaction data. Different data may be associated with one or more different dimensions. Each dimension may correspond to one or more values. For example, in the dimension of time, the corresponding values may include a time period, such as a week, a month, a specific year, etc. In the dimension of department, the corresponding values may include: Engineering, Finance, IT, Sales, etc. In the dimension of Cardholder, the corresponding values may include cardholder identities in the form of name or identification number, for example, Alex, Phillip, Alise, etc.

In one embodiment, the values of the merchants dimension provided by the dimension identification engine 240 are different from the merchant category codes (MCC). In one embodiment, the computing server 110 uses a lookup table to determine whether a transaction is associated with a category provided by the rule management server 110 based on MCC. For example, the MCC provides more than 200 categories while the values of the merchants dimension provided by the dimension identification engine 240 may include a small number of categories (e.g., less than 50 categories). In some embodiments, a lookup table is constructed to map the MCC categories to the values of the merchants dimension provided by the dimension identification engine 240.

The report generation engine 250 generates a multi-dimensional data report. The report generation engine 250 may include a filtering selection engine 252, a grouping selection engine 254, a time selection engine 256, and a prediction model 258. The report generation engine 250 may receive an aggregation of the data record (e.g., from a transaction terminal or from an end user), and provide the aggregated data for presentation to a user. In some embodiments, the aggregated data may include the data generated by the computing server 110 and/or the data records received from various external data sources, such as transaction terminals 150 or third-party servers. For example, the received data may be electronic fund transfers, payments records, credit card transaction records, etc. The computing server 110 may aggregate all types of expenses reflected in different sets of data to show a total expense of an organization client.

The report generation engine 250 may cause the interface 260 to communicate with the application 142 and provides data to be rendered in the application 142. The application 142 may cause the interface 144 to visualize the aggregated data as a two-dimensional temporal graph. The report generation engine 250 may also receive user input from the interface 144 and performs filtering, grouping, and/or selecting functions on the aggregated data to update the multi-dimensional data report based on the received user input. In some embodiments, the report generation engine 250 may cause the interface 144 to display the aggregated data based on the values in a selected dimension. Each value of the selected dimension may be associated with a visual element that is distinguishable from other values. A totality of the plurality of the values of the selected dimension forms the accumulative information of the data.

The filtering selection engine 252 filters the aggregated data that is associated with a specific dimension based on a user input via the client device 140. The computing server 110 receives the user input indicating a selected dimension to filter the aggregated data. The selected dimension may include: location, amount, vendor, cardholder, category, department, payment type, card type, card program, organization team, accounting fields, etc. In response to receiving the filtering selection, the filtering selection engine 252 filters the aggregated data to generate a subset of data, and the subset of data is a subset of the aggregated data which is associated with the selected dimension. The generated subset of data is used by the report generation engine 250 to generate a multi-dimensional data report, causing the graphical user interface 144 of the client device 140 to display the two-dimensional temporal graph with the generated subset of data. In one example, the selected dimension may be a "Holiday Party Program," and the generated subset of data is the transactions generated for the "Holiday Party Program," which is a subset data of all transaction records. In some embodiments, the computing server 110 may receive, from the client device 140, one or more additional filtering selections by one or more additional dimension. The filtering selection engine 252 may further filter the aggregation of data by the one or more additional dimensions to generate a corresponding subset of data. The corresponding subset of data is the aggregated data that is associated with the selected dimension and the one or more additional dimensions. For example, the computing server 110 may receive a first filtering selection with a dimension of "Holiday Party Program" and a second filtering selection with a dimension of "hiring." The corresponding generated subset of data may be transactions related to expenses in the "Holiday Party Program" that is used for "hiring."

The grouping selection engine 254 groups the aggregated data that is associated with a specific dimension based on a user input via the client device 140. The computing server 110 receives a grouping selection to group the aggregated data by a user-selected dimension. In response to receiving the grouping selection, the grouping selection engine 254 groups the subset of data based on the values of the selected dimension. The grouping selection engine 254 may group the aggregate data for each dimensional value. Similarly, the grouped data is used by the report generation engine 250 to generate a multi-dimensional data report, causing the graphical user interface 144 of the client device 140 to display the two-dimensional temporal graph with the grouped data. For example, an amount of transactions may be grouped based on the values of "departments" dimension. The "departments" dimension may include values, such as, "Talent," "Engineering," "Finance," etc. The grouping selection engine 254 may group the transaction amount by the "departments" dimension so that the data belong to "Talent," "Engineering," "Finance," etc. are separated.

In some embodiments, the filtering selection engine 252 may first filter the aggregated data by a first dimension to generate a subset of data, and the grouping selection engine 254 may group the generated subset of data based on a second dimension. For example, the filtering selection engine 252 filters the aggregated data by the first dimension "hiring" to generate the subset of data, which corresponds to the transaction amounts associated with "hiring." The grouping selection engine 254 may then group the subset of data by a second dimension, e.g., "departments," to view the transaction amounts grouped by "departments." The filtering selection engine 252 and grouping selection engine 254 may perform operations on the aggregated data in a sequential order or simultaneously. Filtering and grouping operations on the aggregated data do not need to be performed by the specific order.

The time selection engine 256 selects the aggregated data based on a time period input by the user via the client device 140. The computing server 110 receives a time period selection to generate a subset of data. In response to receiving the time selection, the time selection engine 256 selects a subset of data that is associated with the selected time period. The selected time period may be a week, a month, a year, or a time range specified by the user. The generated subset of data is used by the report generation engine 250 to generate a multi-dimensional data report, causing the graphical user interface 144 of the client device 140 to display the two-dimensional temporal graph with the generated subset of data. For example, a user may select to view all the transaction records for "hiring" that are generated in September 2022. In response to receiving the time period, selection time selection engine 256 selects the corresponding transaction records and causes the graphical user interface 144 to display the two-dimensional temporal graph showing the corresponding transaction records. In some embodiments, the time selection engine 256 may also generate a subset of data in a second time period prior to the selected time period for comparison.

The prediction model 258 predicts information of the subset of data in an upcoming time period. For example, the time selection engine 256 generate a first subset of data in a selected time period, e.g., September 2022; the prediction model 258 may predict a corresponding subset of data in the upcoming period, i.e., October 2022. The subset of data may include transaction amounts, and the predicted information may include the predicted amount to be spent in the future. The prediction model 258 may predict the information based on the analysis performed on the subset of data in one or more pervious time periods. The prediction model 258 may apply a model to determine the future information associated with the subset of data in an upcoming period. The model may be a machine learning model or an algorithmic model that includes a set of rules to determine the information, e.g., transaction amount, in the upcoming period.

The interface 260 includes interfaces that are used to communicate with different parties and servers. The interface 260 may take the form of a SaaS platform that provides clients with access of various functionalities provided by the computing server 110. The interface 260 provides a portal in the form of a graphical user interface (GUI) for clients to create payment accounts, manage transactions, specify rules of each card, and verify records of transactions incurred using the cards. The interface 260 is in communication with the application 142 and provides data to render the application 142.

In one embodiment, the interface 260 also includes an API for clients of the computing server 110 to communicate with the computing server 110 through machines. The API allows the clients to retrieve the computing server 110 stored in the data store 120, send query requests, and make settings through a programming language. Various settings, creation of cards, rules on the cards, rules of verifying records, and other functionalities of the various engines 210, 220, 230, and 240 may be changed by the clients through sending commands to the API.

Multi-Dimensional Data Report Process

Figure 3:
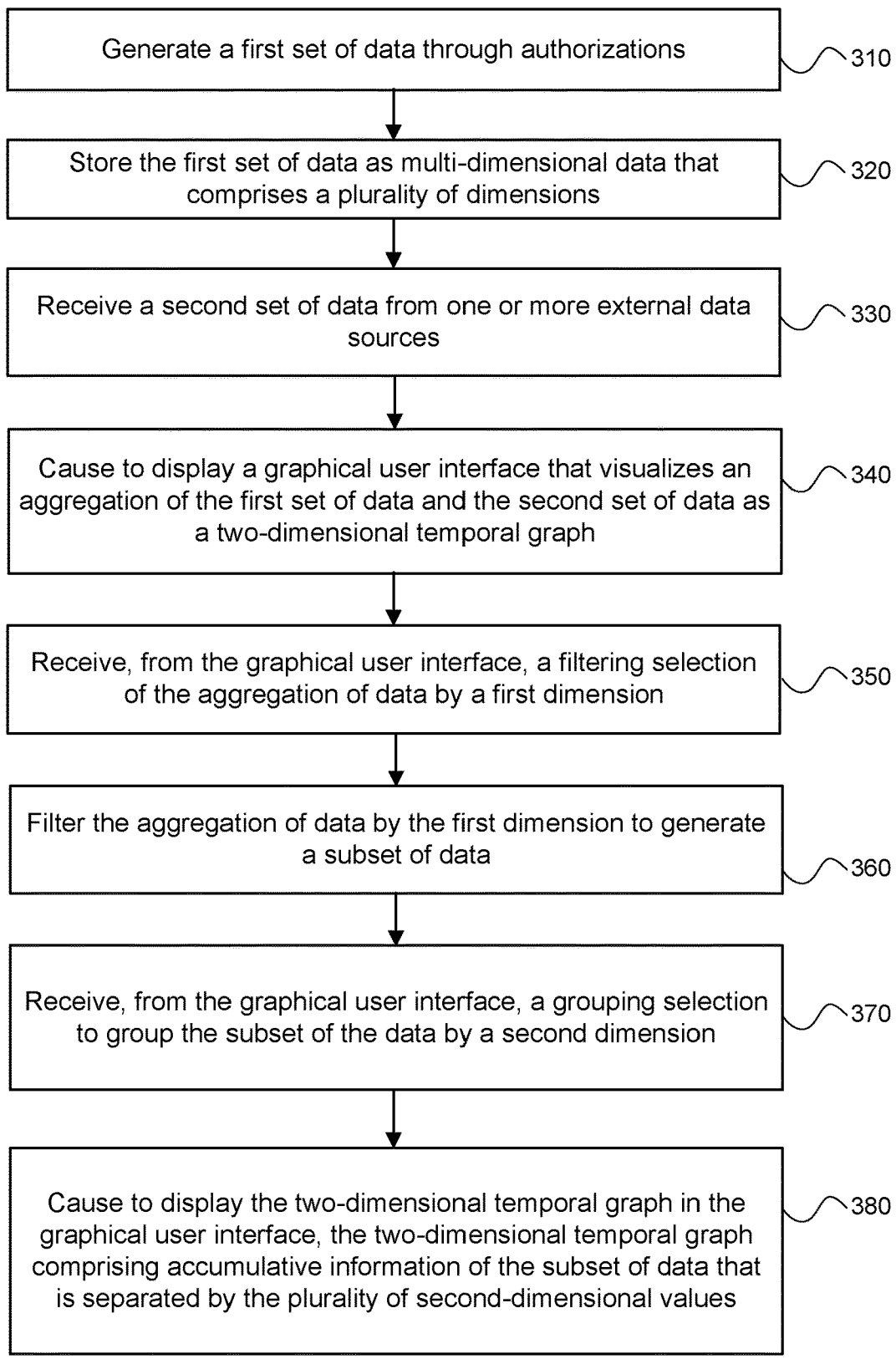
FIG. 3 is a flowchart depicting a computer-implemented process for generating a multi-dimensional data report, in accordance with an embodiment.

FIG. 3 is a flowchart depicting a computer-implemented process 300 for generating a multi-dimensional data report, in accordance with an embodiment. A computer associated with the computing server 110 includes a processor and memory. The memory stores a set of code instructions that, when executed by the processor, causes the processor to perform some of the steps described in the process 300. The computing server 110 may manage authorizations on behalf of a domain. The authorizations may refer to transaction authorizations, such as credit card authorizations, corporate card authorizations, etc. The domain may be identified based on one or more parameters associated with the authorization, or based on the unique identifier associated with the authorization. In some embodiments, the domain is associated with the transaction account that was used to complete the transaction. For example, the organization may set us a set of rules for associating transactions completed with specific transaction accounts to corresponding domains. Alternatively, or additionally, the domain is associated with one or more parameters of the transaction. For example, the organization may set up a set of rules for associating transactions having one or more specific parameters (e.g., specific merchants or specific categories) to corresponding domains.

The computing server 110 generates 310 a first set of data through the authorizations. The first set of data may include authorization records between user accounts of the domain and third-party named entities. For example, the authorization records may be transaction records that are associated with the transaction accounts of an organization, and the computing server 110 is delegated by the domain to authorize the transactions. After a transaction is authorized, an authorization record, such as a transaction record, is generated to document the transaction. The transaction accounts may include, for example, a serial number of the transaction account such as a credit card number, which is used to complete the transactions. The transaction records may include parameters associated with the transactions and the third-party named entities. The computing server 110 may access to the transaction records and generate a set of transaction data based on the transaction records.

The computing server 110 stores 320 the first set of data as multi-dimensional data that includes a plurality of dimensions. The first set of data is generated based on the authorization records based on the user accounts of the domain and the third-party named entities. For example, the user accounts and the third-party named entries may be two of the dimensions of the first set of data. The authorization records, e.g., transaction records, may further include parameters associated with the transaction information, such as transaction amount, transaction time, merchants, etc. In some embodiments, the plurality of dimensions may further include: time, location, amount, vendor, cardholder, category, department, payment type, card type, card program, organization team (e.g., manager, direct reports, etc.), accounting fields, etc. The accounting fields may include third-party defined fields such as fields that are included in NetSuit, Quickbooks, Sage, Xero, Universal CSV accounting, etc. Each dimension may correspond to one or more values. For example, in the dimension of time, the corresponding values may include a specific time period, such as a specific week, a specific month, a specific year, etc. In the dimension of department, the corresponding values may include: Engineering, Finance, IT, Sales, etc. In the dimension of Cardholder, the corresponding values may include cardholder identities in the form of name or identification number, for example, Alex, Phillip, Alise, etc. The authorization records from different domains may be in different formats and/or include different values in different dimensions. In some embodiments, the computing server 110 may extract information corresponding to one or more dimensions from the authorization records to generate 310 the first set of data. The computing server 110 may identify the values for one or more of the dimensions and stores 320 the first set of data with the identified values as a multi-dimensional data. In some examples, the computing server 110 may store the multi-dimensional data in a unified data format.

The computing server 110 further receives 330 a second set of data from one or more external data sources. The second set of data may be data that are not generated by the computing server 110, for example, other transaction records that are transmitted from third parties instead of credit card transactions that are authorized by the computing server 110. Examples of the second set of data may be data records of electronic fund transfer, payments, check records, other forms of transfers, credit card expenses that are not managed by the computing server 110, etc. Some second type of data may also be manually entered payment records, such as payments to physical invoices that are not documented electronically. Electronic fund transfer can be bank payments, bank transfers, credit card payments, automated teller machine (ATM) transfers, direct deposits, debits, online transfers, peer-to-peer transactions such as VENMO, instant-messaging fund transfers such as FACEBOOK PAY and WECHAT PAY, wire transfer, electronic bill payment, automated clearing house (ACH) transfer, cryptocurrency transfer, blockchain transfer, etc. Depending on the type of electronic fund transfers, the external data sources may be different. For example, if an electronic fund transfer is a bank payment, the external data source can be a bank's server which allows the computing server 110 to retrieve records by API. An ATM, a bank website, a peer-to-peer mobile application, and an instant messaging application can also be examples of the external data sources.

The computing server 110 causes 340 a client device 140 to display a graphical user interface 144 that visualizes an aggregation of the first set of data and the second set of data as a two-dimensional temporal graph (e.g., example graphical user interface of FIGS. 4-9). The data may be aggregated to show a total expense of an organization client. For example, the organization client may have different expenses associated with different sources, such as credit card transactions that are managed by the computing server 110, other credit card transactions that are not managed by the computing server 110, electronic payment transfers, checks, and other expenses. The computing server 110 may aggregate all types of expenses reflected in different sets of data. While in the process 300 the first and second sets of data are used as examples to discuss the aggregation, in various embodiments there can be multiple sets of data.

Similar to the first set of data, the second set of data may also be stored by the computing server 110 as multi-dimensional data. The computing server 110 may aggregate the first set of data and the second set of data based on one or more dimensions. The aggregated data may be an aggregation of transaction data associated with one or more of the dimensions. For example, the aggregated data may be transactions from an hiring department of an organization, corporate expenses of an organization in a certain time period, invoices generated by a plurality of cardholders for participating certain events, etc. The computing server 110 causes 340 the client device 140 to display the graphical user interface 144 which provides a graphical illustration of the aggregated transaction data. One dimension of the temporal graph is time and the other dimension may be the amount of transactions. Both bar chart and line graphs and other suitable chart format may be used for showing transactions spent over a period of time.

The computing server 110 receives 350, from the graphical user interface 144, a filtering selection of the aggregation of data by a first dimension. A client may interact with the graphical user interface 144 to select data that is associated with a specific dimension, such as, location, amount, vendor, cardholder, category, department, payment type, card type, card program, organization team, accounting fields, etc. In some embodiments, the first dimension may include a plurality of first-dimensional values. For example, the dimension of "category" may include values, such as, hiring, hiring, research and development, etc. The client may interact with the graphical user interface 144 to filter and select a subset of data with a specific first-dimensional value. The graphical user interface 144 may include an interface element that provides a filtering selection function on the temporal graph. By interacting with the interface element, a user can filter and select the aggregated data with the first dimension.

The computing server 110 filters 360 the aggregation of data by the first dimension to generate a subset of data. In response to receiving the filtering selection, the computing server 110 filters 360 the aggregated data to generate a subset of data, and the subset of data is a subset of the aggregated data which is associated with the first dimension. For example, the first dimension may be a "Holiday Party Program," and the subset of data is the transactions generated for the "Holiday Party Program." In another example, the first dimension may refer to a first-dimensional value, e.g., "hiring" in the dimension of "category." The corresponding generated subset of data may be the transactions related to expenses in "hiring."

In some embodiments, the computing server 110 may receive, from the graphical user interface 144, one or more additional filtering selections by one or more additional dimension. The computing server 110 may further filter the aggregation of data by the first dimension and the one or more additional dimensions to generate a corresponding subset of data. The corresponding subset of data is the aggregated data that is associated with the first dimension and the one or more additional dimensions. For example, the computing server 110 may receive a first filtering selection with a dimension of "Holiday Party Program" and a second filtering selection with a dimension of "hiring." The corresponding generated subset of data may be transactions related to expenses in the "Holiday Party Program" that is used for "hiring."

Figure 4A:
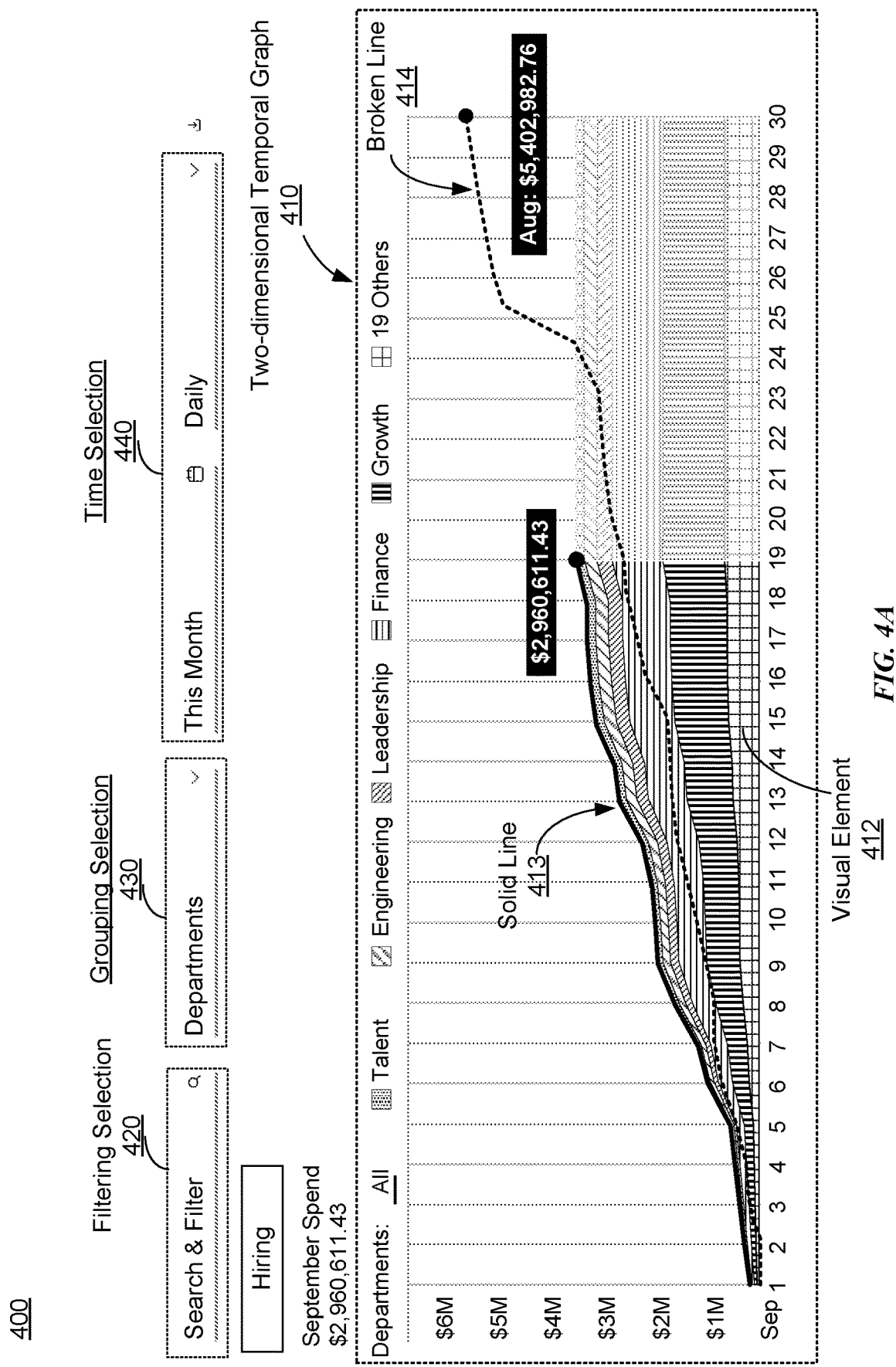
FIG. 4A illustrates an example graphical user interface 400 for reporting a multi-dimensional data, in accordance with an embodiment.

The computing server 110 receives 370, from the graphical user interface 144, a grouping selection to group the subset of the data by a second dimension. As the aggregated data is a multi-dimensional data, after being filtered by the first dimension, the generated subset of data may be associated with one or more other dimensions. A user may interact with the grouping selection to group the subset of data based on another dimension, e.g., a second dimension. The second dimension of the subset of data may include a plurality of second-dimensional values. In response to receiving the grouping selection, the computing server 110 groups the subset of data based on the second-dimensional values. For example, the aggregated data is filtered by the first dimension "hiring" to generate the subset of data, which corresponds to the transaction amounts associated with "hiring." A user may select to group the subset of data by a second dimension, e.g., "departments," to view the transaction amounts grouped by "departments." The "departments" dimension may include a plurality of values, such as, "Talent," "Engineering," "Finance," etc. The computing server 110 groups the transaction amounts for each second dimensional value. As shown in FIG. 4A as an example, the amount of transactions that are associated with "hiring" is grouped based on the values of "departments," providing transaction amount associated with each "department," e.g., "Talent," "Engineering," "Finance," etc.

The computing server 110 causes 380 to display the two-dimensional temporal graph in the graphical user interface 144. With the filtering selection and the grouping selection, the original two-dimensional temporal graph is updated to a two-dimensional temporal graph with the subset of data that is grouped based on the second-dimensional values. The two-dimensional temporal graph includes accumulative information of the subset of data that is separated by the plurality of second-dimensional values. A totality of the plurality of the second-dimensional values forms the accumulative information. The computing server 110 may further present the subset of data with each second-dimensional value being associated with a visual element that is distinguishable from other second-dimensional values. As shown in FIG. 4A, the computing server 110 presents the accumulative information with a solid line 413, indicating the total amount of transactions associated with "hiring" is $2,960,611.43. The transaction amount for each second-dimensional values, e.g., "Talent," "Engineering," "Finance," etc., is presented with a distinguishable visual element. In this way, a user may visually compare the transaction amounts among different second-dimensional values. Both accumulative information and individual information may be presented to the user via the two-dimensional temporal graph in the graphical user interface 144. For example, a user may visually view the amount spent by the "Engineering" department for "hiring," compare it to the amount spent by the "Talent" department for "hiring," and analyze its percentage with respect to the total amount spent for "hiring." By using the filing selection and the grouping selection, the multi-dimensional data can be presented to the user in a graphical user interface with distinguishable visual elements which visually facilitate the user's viewing, comparing and analyzing the multi-dimensional data based on the selected dimensions.

In some embodiments, the computing server 110 may receive, from the graphical user interface 144, a time period selection to generate a second subset of data. The second subset of data includes the subset of data in the selected time period. The selected time period may be a week, a month, a year, or a time range specified by a user. For example, a user may select to view all the transaction records for "hiring" that are generated in September 2022. In response to receiving the time period selection, the graphical user interface 144 displays the two-dimensional temporal graph showing the information of the second subset of data. In some embodiments, the two-dimensional temporal graph may also include the first subset of data in a second time period prior to the selected time period. As shown in FIG. 4A as an example, the selected time period is "this month," e.g., September and the transaction amounts in September is illustrated in the graphical user interface 144 as a solid line. The graphical user interface 144 also displays the total transaction amounts in a previous time period, e.g., August illustrated as a broken line 414 with a total amount of $5,402,982.76.

Figure 9:
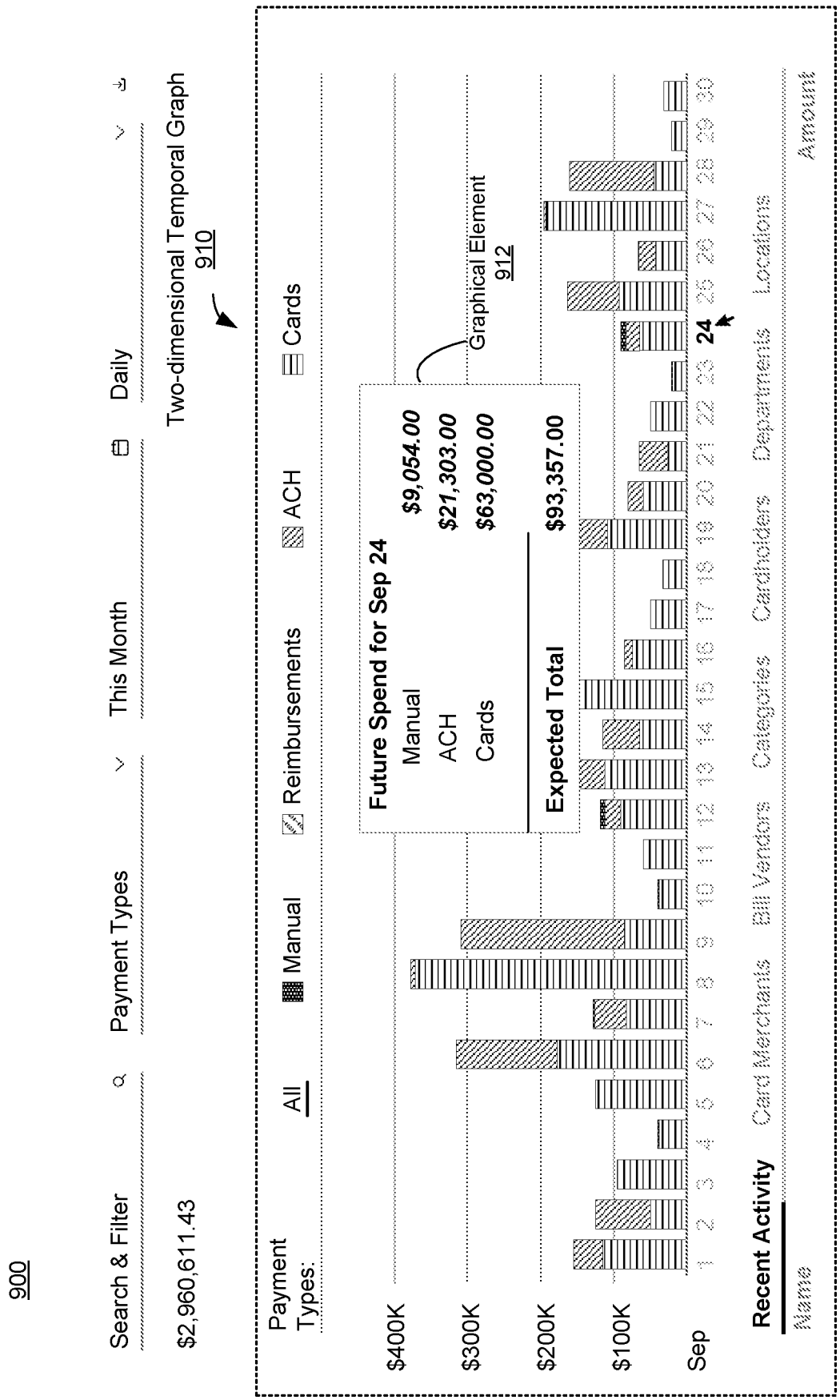
FIG. 9 illustrates another example graphical user interface 900 for reporting a multi-dimensional data, in accordance with an embodiment.

In some embodiments, the computing server 110 may predict information of the subset of data in an upcoming time period. The predicted information may include the predicted amount to be spent in the future, based on the analysis performed on the subset of data in one or more pervious time periods. The computing server 110 may apply a model to determine the future information associated with the subset of data in an upcoming period. The model may be a machine learning model or an algorithmic model that includes a set of rules to determine the information, e.g., transaction amount. The future information may include accumulative information of the first subset of data, and/or information associated with each second-dimensional value when a grouping selection is applied. The computing server 110 displays the predicted information via the two-dimensional temporal graph in the graphical user interface 144. As shown in FIG. 9 as an example, September 19 is the current date, the subset of data includes transaction records from September 1 to 19, and the computing server 110 predicts the subset of data for the time period of September 20 to 30 and displays the predicted subset of data in the two-dimensional temporal graph 910. The predicted subset of data is also presented with each second-dimensional value being associated with the corresponding visual element that is distinguishable from other second-dimensional values.

Figure 5:
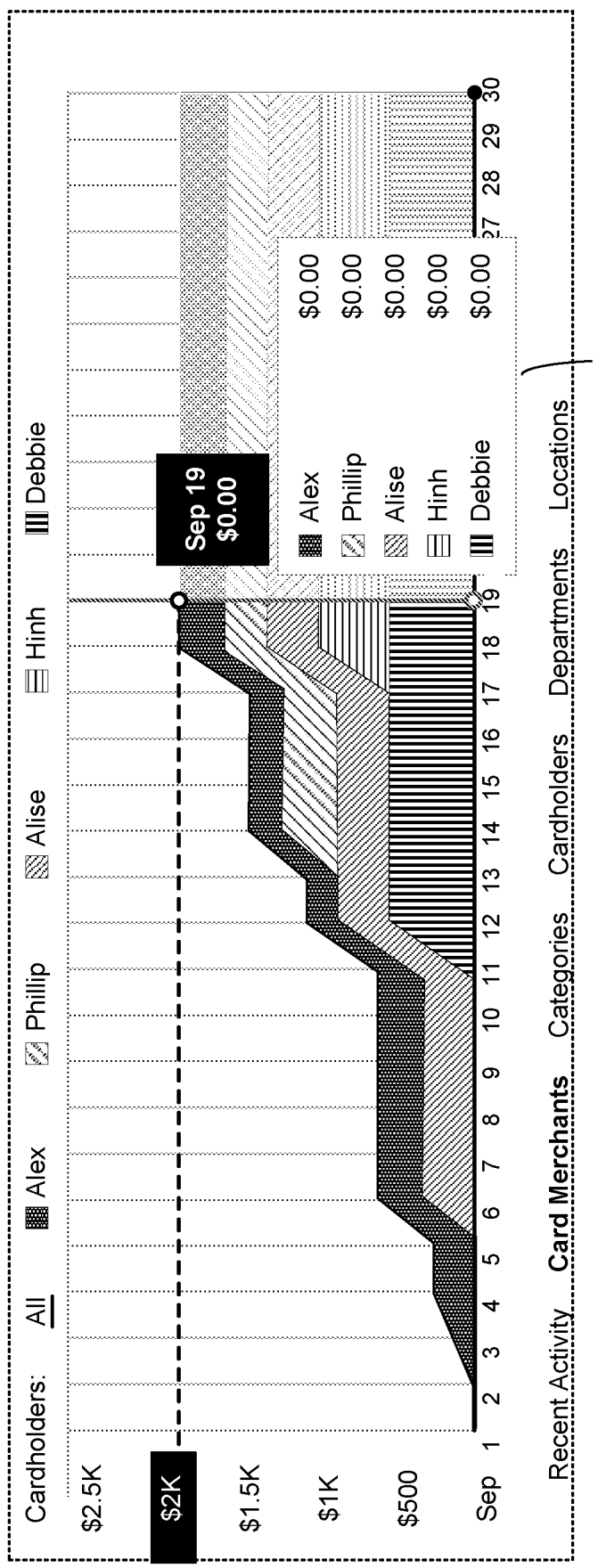
FIG. 5 illustrates another example graphical user interface 500 for reporting a multi-dimensional data, in accordance with an embodiment.

A user may interact with the graphical user interface 144 by interacting (e.g., hovering a cursor) one or more data points in the two-dimensional temporal graph. Responsive to receiving the user interaction with the graphical user interface 144, the computing server 110 may update the graphical user interface 144 accordingly. In one example, a user may interact with a specific date in the two-dimensional temporal graph, the computing server 110 may cause the graphical user interface 144 to display a graphical element 512 overlaying the two-dimensional temporal graph 510 (as shown in FIG. 5). The graphical element 512 includes the subset of data on the selected date. For example, the graphical element 512 may break down the subset of data based on each second-dimensional value. Similarly, a user may also interact with a specific date in the future. As shown in FIG. 9 as an example, September 19 is the current date, a user may select a future date, e.g., September 24, and the computing server 110 may cause the graphical user interface 144 to display a graphical element 912 overlaying the two dimensional temporal graph 910 for displaying the predicted subset of data of the second-dimensional values on the selected date.

Figure 6:
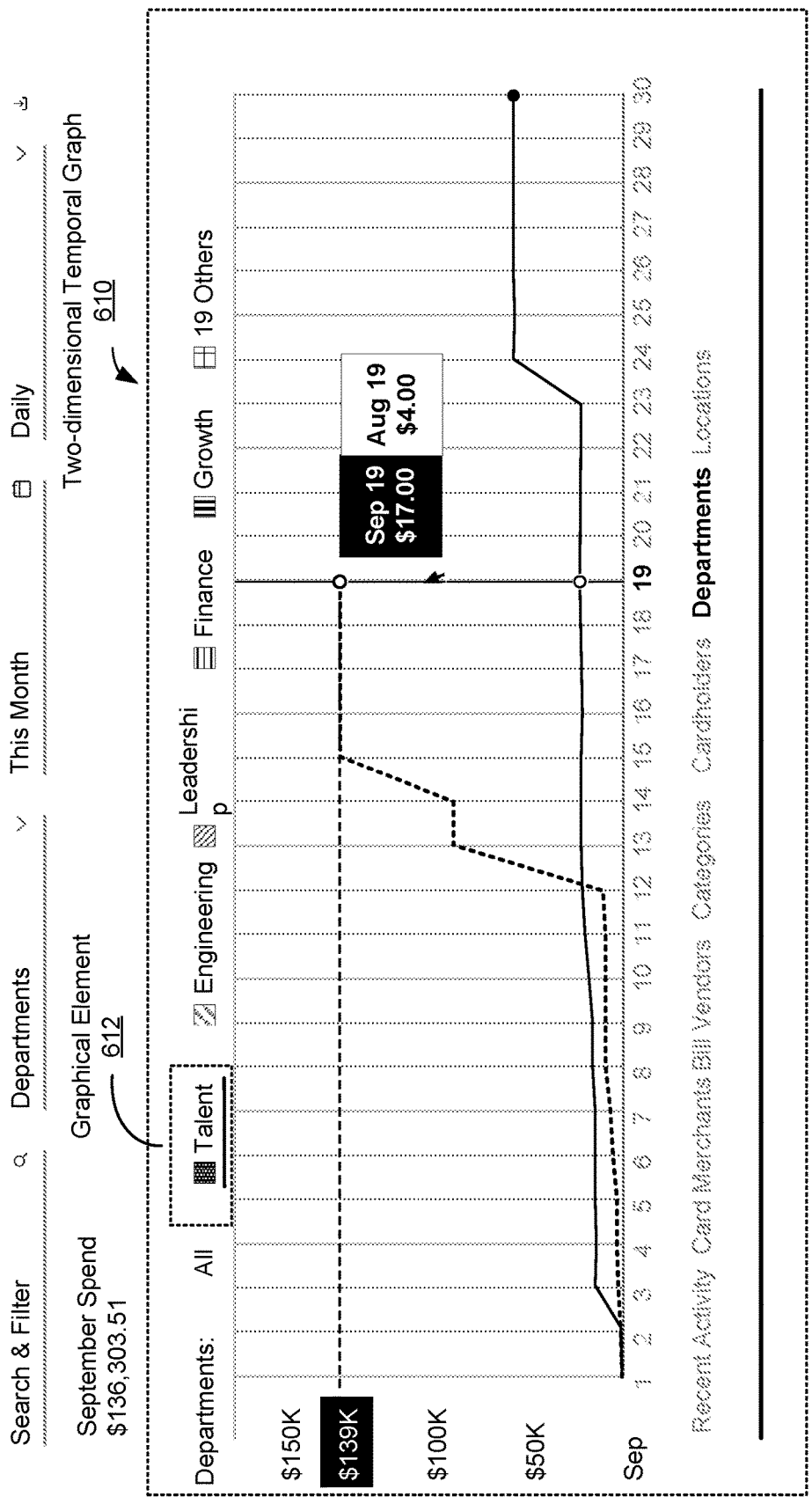
FIG. 6 illustrates another example graphical user interface 600 for reporting a multi-dimensional data, in accordance with an embodiment.

In another example, a user may interact with a specific second-dimensional value. Responsive to receiving the user interaction with the graphical user interface 144, the computing server 110 may cause the graphical user interface 144 to display the subset of data associated with the selected second-dimensional value only and not display the subset of data that are associated with other second-dimensional values. For example, a user may interact with the two-dimensional temporal graph, e.g., by clicking the subset of data associated with "Talent." Responsive to the interaction, the computing server 110 displays the transaction records of "Talent" in September in the two-dimensional temporal graph (as shown in FIG. 6). In some embodiments, the computing server 110 may further display the transaction records of "Talent" in a previous time period, e.g., August in the two-dimensional temporal graph for comparison.

Figure 7:
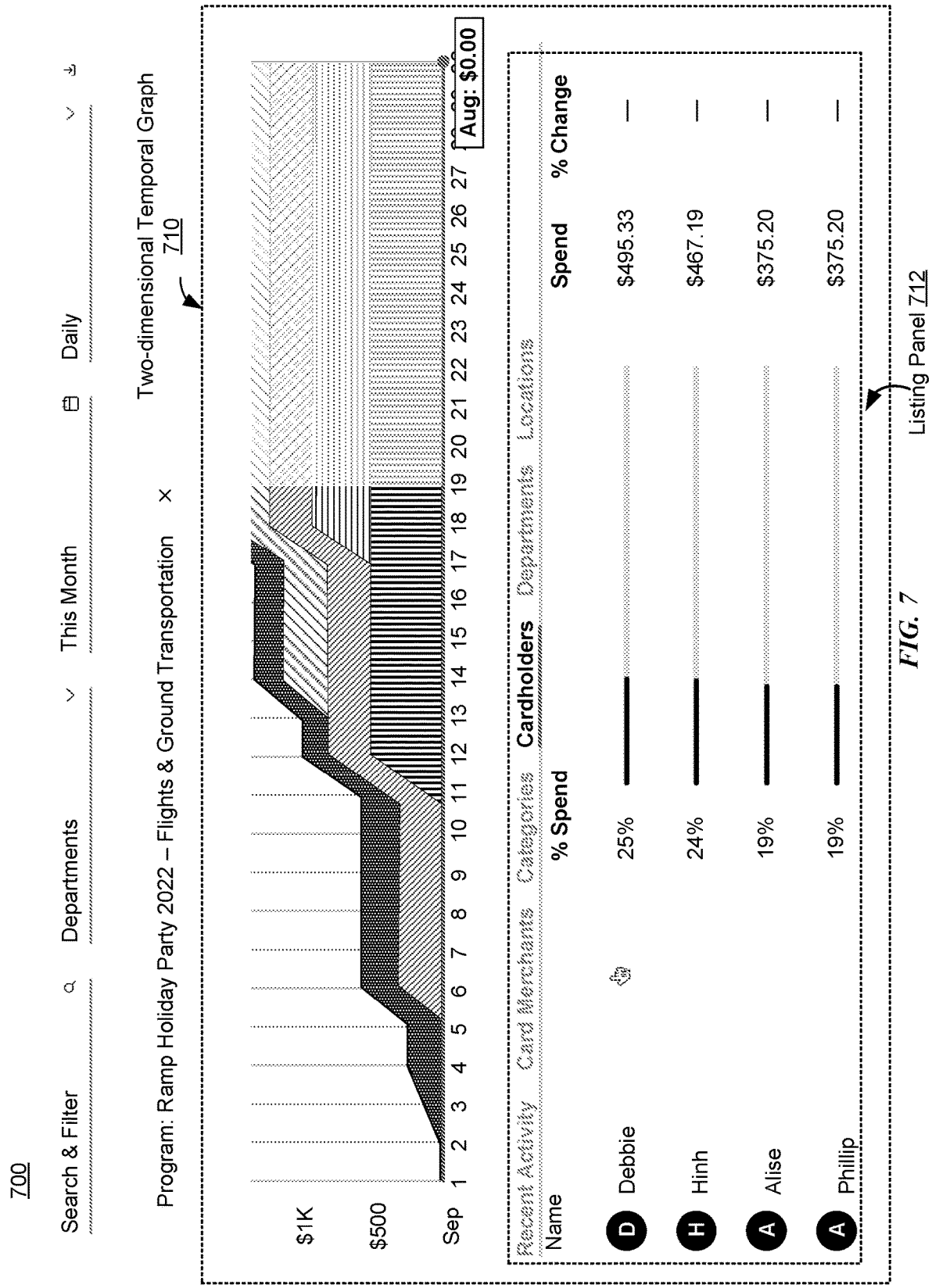
FIG. 7 illustrates another example graphical user interface 700 for reporting a multi-dimensional data, in accordance with an embodiment.

In some embodiments, computing server 110 may cause the graphical user interface 144 to display the subset of data in a listing format. The graphical user interface 144 may include a panel to present the subset of data in a list. A user may interact with the listing panel and select a third dimension, e.g., "Cardholders," "Locations," etc. Responsive to receiving the user's selection of the third dimension, the computing server 110 may rank the first subset of data based on the information associated with the third dimension. As shown in FIG. 7, a user may select "Cardholders" as the third dimension. The third dimension may also include a plurality of third-dimensional values. The values of "Cardholders" may be, for example, Debbie, Hinh, Alise, Phillip, etc. The computing server 110 then ranks the transaction amount of each Cardholder and displays the transaction amount in a ranked order in the listing panel of graphical user interface 144.

The graphical user interface 144 may include various input elements for a user to specify a threshold amount for the subset of data in one or more dimensions. For example, a user may set a threshold amount of "$500.00" for the transaction amount associated with any Cardholder. In response to a transaction amount associated with a third-dimensional value exceeding the threshold amount, the computing server 110 may cause the graphical user interface 144 to send a notification to a user device to inform the user about the transaction amount associated with the third-dimensional value.

Example User Interfaces

FIG. 4A illustrates an example graphical user interface 400 for reporting a multi-dimensional data, in accordance with an embodiment. The graphical user interface 400 is a graphical user interface that may be provided by the interface 260 of the computing server 110. The graphical user interface 400 is displayed by the interface 144 of a client device 140. In some embodiments, the graphical user interface 400 may be displayed by a webpage browser, a mobile application, etc.

As shown in FIG. 4A, the graphical user interface 400 includes a two-dimensional temporal graph 410, which is a graphical illustration of the aggregated multi-dimensional data. In some embodiments, one dimension of the temporal graph 410 is time and the other dimension may be information of the data, e.g., an amount of transactions. The temporal graph 410 is configured to show the amount of transactions spent over a period of time. The illustration of the information may be based on the dimensions of the aggregated data.

The graphical user interface 400 may further include one or more user interactive elements: filtering selection 420, grouping selection 430, and time selection 440. These user interactive elements receive user input and allow a user to filter, group, and select a subset of data for display in the graphical user interface 400. The filtering selection 420 is configured to filter the aggregated data that is associated with a specific dimension. In response to receiving a user's filtering selection, the filtering selection 420 filters the aggregated data to generate a subset of data, and the subset of data is a subset of the aggregated data which is associated with the selected dimension. The grouping selection 430 is configured to group the aggregated data that is associated with a specific dimension. In response to receiving the user's grouping selection, the grouping selection 430 groups the subset of data based on the values of the selected dimension. The time selection 440 is configured to select the aggregated data based on a time period. In response to receiving the time selection, the time selection 440 selects a subset of data that is associated with the selected time period. As shown in FIG. 4A, the filtering selection 420 receives a user's input to filter the aggregated data with a first dimension "Hiring," the grouping selection 430 receives the user's input to group the data in a second dimension "Department," and the time selection 440 receives the user's input to select the data in this month and present the data in a daily basis. As a result, the two-dimensional temporal graph 410 display the transaction records for "Hiring" that are generated in September 2022 based on the values in the group-by dimension of "Department." Each value of the "Department" dimension, e.g., "Talent," "Engineering," "Leadership," etc., is associated with a visual element 412 that is distinguishable from other values. The accumulative information is illustrated with a solid line, indicating a totality of the plurality of the values of the selected dimension. In FIG. 4A, the total amount of transactions associated with "Hiring" in September 2022 is $2,960,611.43. The graphical user interface 400 also displays the total transaction amounts in a previous month, e.g., August illustrated as a broken line with a total amount of $5,402,982.76.

Figure 4B:
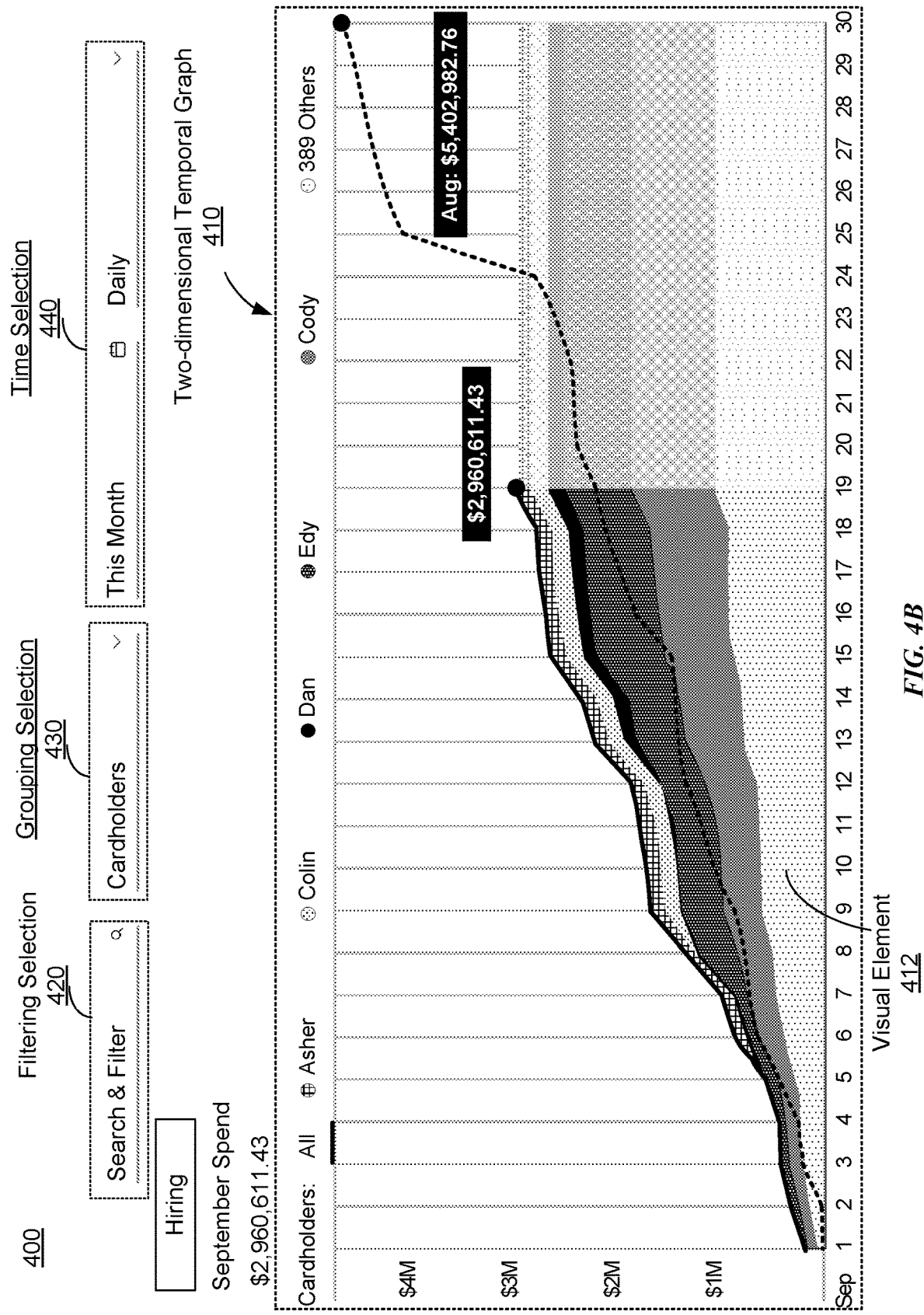
FIG. 4B illustrates another example graphical user interface 400 for reporting a multi-dimensional data, in accordance with an embodiment.

FIG. 4B illustrates an example graphical user interface 400 for rendering multi-dimensional data, in accordance with an embodiment. Following the context of the example described in FIG. 4A, FIG. 4B illustrates the two-dimensional temporal graph 410 with another group-by selection of dimension. In some embodiments, if the group-by selection of dimension changes, the two-dimensional temporal graph 410 displays the same accumulated value by the underlying divided regions changes based on the new group-by dimension. For example, the new group-by dimension may be by expense types, e.g., credit card payments, bank direct pay, checks, etc. In another example, the new group-by dimension may be by cardholders, i.e., the account names of the cardholders, such as Asher, Colin, Daniel, etc.

FIG. 5 illustrates an example graphical user interface 500 for rendering multi-dimensional data, in accordance with an embodiment. Following the context of the example described in FIGS. 4A and 4B, the graphical user interface 500 allows the user to interact with the two-dimensional temporal graph 510. For example, a user may select a specific date in the two-dimensional temporal graph 510 by hovering the cursor, clicking on the two-dimensional temporal graph 510, etc. In response to the user interaction, the graphical user interface 500 may display a graphical element 512 overlaying the two-dimensional temporal graph 510. The graphical element 512 includes the subset of data on the selected date. As shown in FIG. 5, the graphical element 512 breaks down the subset of data based on each dimensional value. The dimension for the grouping selection is "Cardholders," and the graphical element 512 shows the transaction amount for each cardholder, e.g., Alex, Phillip, Alise, etc. on the selected date of Sep. 19, 2022.

FIG. 6 illustrates an example graphical user interface 600 for rendering multi-dimensional data, in accordance with an embodiment. Following the context of the example described in FIGS. 4A, 4B, and 5, the graphical user interface 600 allows the user to interact with the two dimensional temporal graph 610 by interacting with one or more graphical element 612. The one or more graphical element 612 may be associated with the values of a dimension. For example, in FIG. 6, values of the "Departments" dimension include: Talent, Engineering, Leadership, etc. The graphical element 612 is associated with the values of the "Departments" dimension. A user may interact with the two-dimensional temporal graph 610, e.g., by clicking the graphical element 612 to select the subset of data associated with "Talent" for display. Responsive to the interaction, the graphical user interface 600 displays the transaction records of "Talent" in September in the two-dimensional temporal graph 610. The graphical user interface 600 may further display the transaction records of "Talent" in a previous time period, e.g., August in the two-dimensional temporal graph 610 for comparison.

FIG. 7 illustrates an example graphical user interface 700 for rendering multi-dimensional data, in accordance with an embodiment. Following the context of the example described in FIG. 4A through FIG. 6, the graphical user interface 700 may include a listing panel 712 to display data in a listing format. A user may interact with the listing panel 712 and select a dimension, e.g., "Cardholders," "Locations," etc. Responsive to receiving the user's selection of the dimension, the graphical user interface 700 may rank the subset of data based on the information associated with the selected dimension. As shown in FIG. 7, a user may select "Cardholders" dimension, and the selected dimension may also include a plurality of values, such as, Debbie, Hinh, Alise, Phillip, etc. graphical user interface 700 then ranks the transaction amount of each Cardholder and displays the transaction amount in a ranked order in the listing panel 712.

Figure 8:
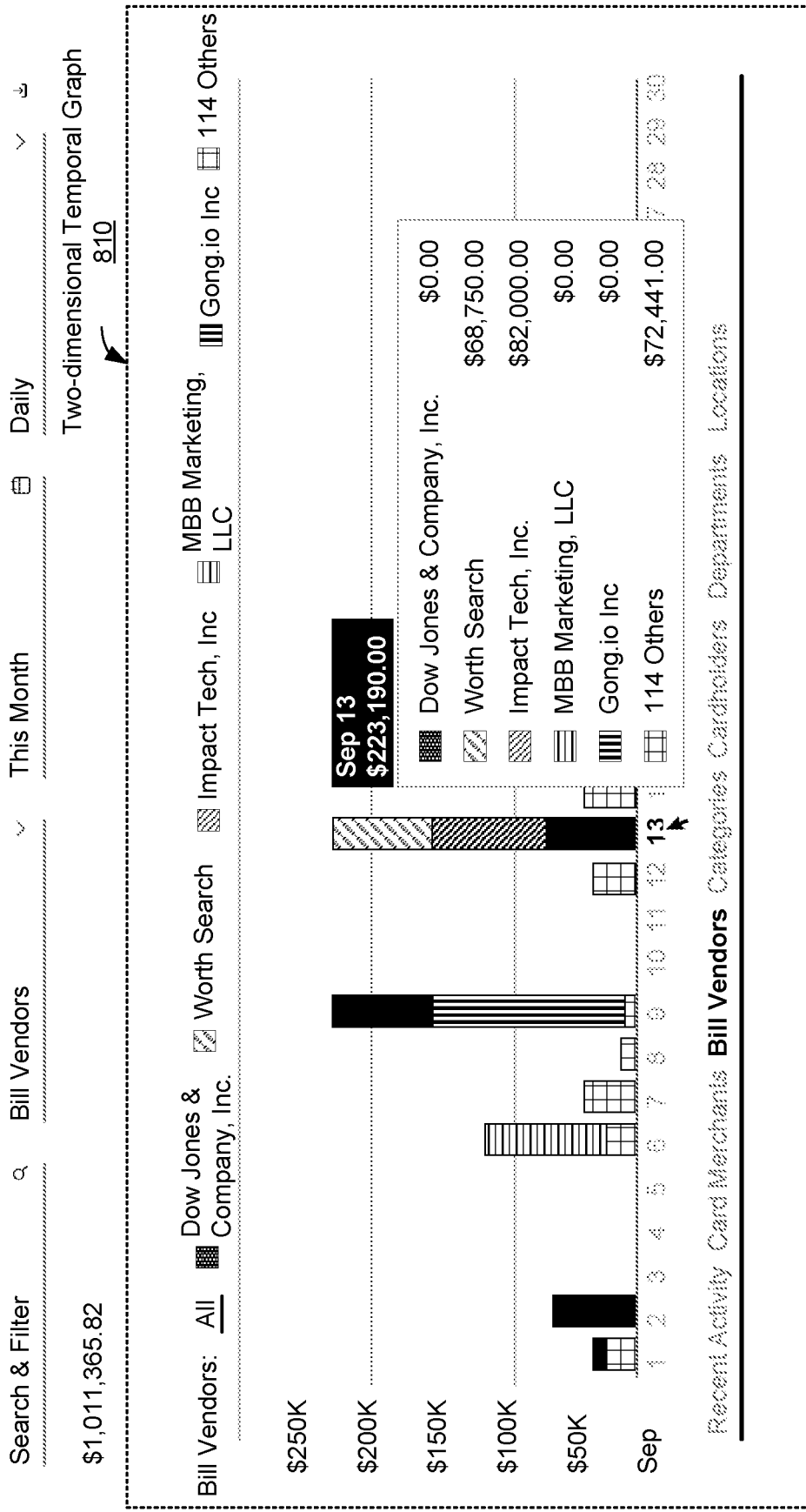
FIG. 8 illustrates another example graphical user interface 800 for reporting a multi-dimensional data, in accordance with an embodiment.

FIG. 8 illustrates an example graphical user interface 800 for rendering multi-dimensional data, in accordance with an embodiment. Following the context of the example described in FIG. 4A through FIG. 7, the graphical user interface 800 displays the two-dimensional temporal graph 810 in a bar chart. A user may select between the accumulative graph shown in FIG. 4A through FIG. 7 and a corresponding bar chart shown in FIG. 8. The bar chart displays the same data of the accumulative graph in a different format.

FIG. 9. illustrates an example graphical user interface 900 for rendering multi-dimensional data, in accordance with an embodiment. Following the context of the example described in FIG. 4A through FIG. 8, the graphical user interface 900 displays the two-dimensional temporal graph 910 in a bar chart. In some embodiments, the two-dimensional temporal graph 910 may include a subset of current data and a subset of predicted data. Assuming September 19 is the current date, the two-dimensional temporal graph 910 includes transaction records from September 1 to 19, and predicted transaction data for the time period of September 20 to 30. A user may interact with a past or future date in the two-dimensional temporal graph, the computing server 110 may cause the graphical user interface 144 to display a graphical element 912 overlaying the two-dimensional temporal graph 910 (as shown in FIG. 9). For example, a user selects September 24, and the graphical element 912 displays the predicted transaction amount for each second-dimensional value. The predicted subset of data is also presented with each second-dimensional value being associated with the corresponding visual element that is distinguishable from other second-dimensional values.

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, future information of the data predicted by the report generation engine 250, such as predicted transaction amount in a future time period, and other processes may apply one or more machine learning and deep learning techniques.

In various embodiments, the training techniques for a machine learning model may be supervised, semi-supervised, or unsupervised. In supervised learning, the machine learning models may be trained with a set of training samples that are labeled. For example, for a machine learning model trained to predict future spending amounts, the training samples may be past transaction records labeled with the dimensions of the data. The labels for each training sample may be binary or multi-class. In training a machine learning model for future spending amounts, the training samples may be the past transaction records in a specific time period with a specific time range that are manually identified. Each past transaction record may be associated with a label such as the transaction amount. In some cases, an unsupervised learning technique may be used. The samples used in training are not labeled. Various unsupervised learning technique such as clustering may be used. In some cases, the training may be semi-supervised with training set having a mix of labeled samples and unlabeled samples.

A machine learning model may be associated with an objective function, which generates a metric value that describes the objective goal of the training process. For example, the training may intend to reduce the error rate of the model in generating predictions. In such a case, the objective function may monitor the error rate of the machine learning model. The objective function of the machine learning algorithm may be the training error rate in predict a spending amount in a training set. Such an objective function may be called a loss function. Other forms of objective functions may also be used, particularly for unsupervised learning models whose error rates are not easily determined due to the lack of labels. In future spending amount prediction, the objective function may correspond to the difference between the model's predicted transaction amounts and the actual transaction amounts (e.g., spending) in the training sets. In various embodiments, the error rate may be measured as cross-entropy loss, L1 loss (e.g., the sum of absolute differences between the predicted values and the actual value), L2 loss (e.g., the sum of squared distances).

Figure 10:
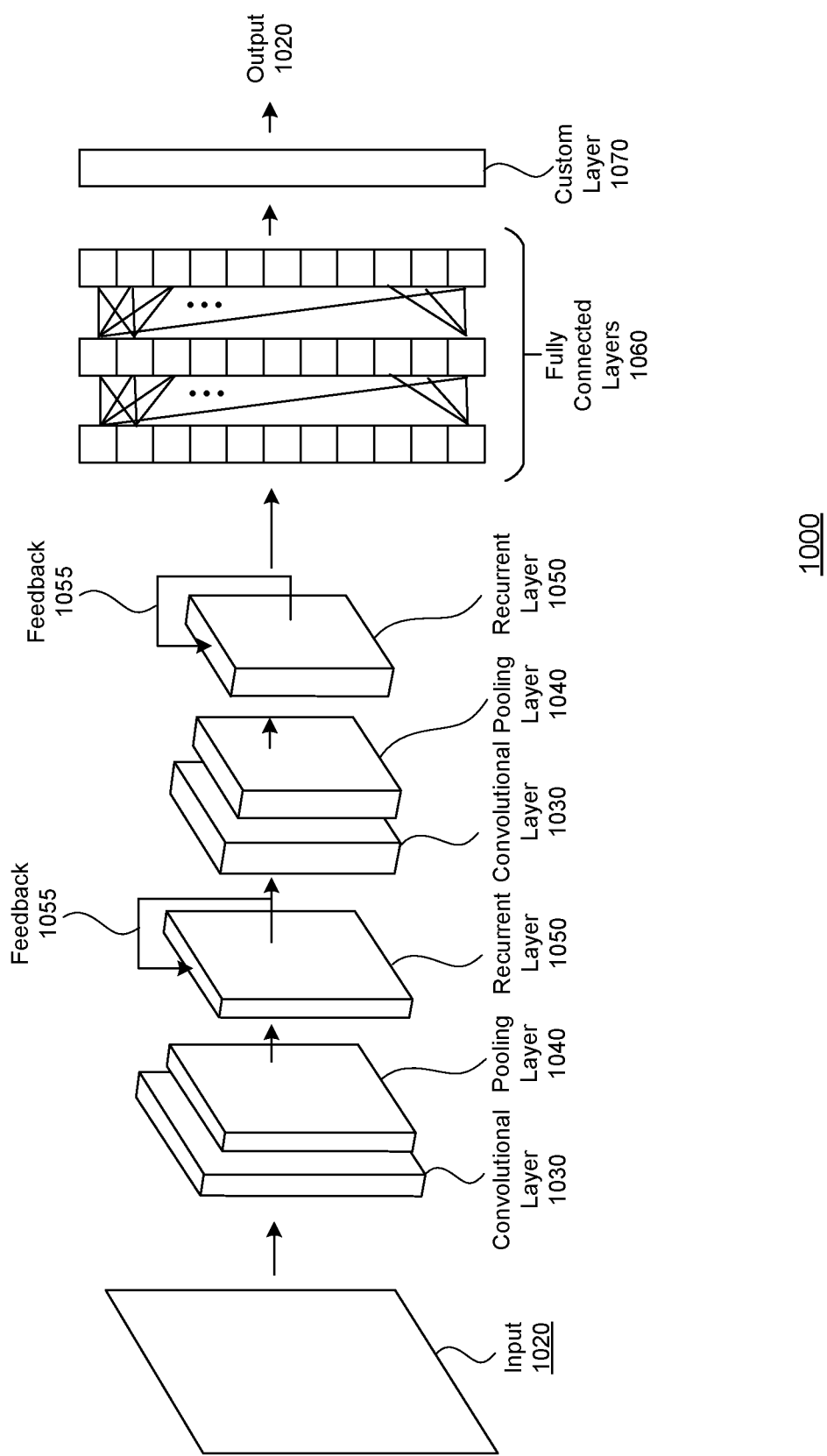

Referring to FIG. 10, a structure of an example CNN is illustrated, according to an embodiment. The CNN 1000 may receive an input 1010 and generate an output 1020. The CNN 1000 may include different kinds of layers, such as convolutional layers 1030, pooling layers 1040, recurrent layers 1050, fully connected layers 1060, and custom layers 1070. A convolutional layer 1030 convolves the input of the layer (e.g., past transaction records) with one or more kernels to generate different types of spending patterns that are filtered by the kernels to generate feature maps. Each convolution result may be associated with an activation function. A convolutional layer 1030 may be followed by a pooling layer 1040 that selects the maximum value (max pooling) or average value (average pooling) from the portion of the input covered by the kernel size. The pooling layer 1040 reduces the spatial size of the extracted features. In some embodiments, a pair of convolutional layer 1030 and pooling layer 1040 may be followed by a recurrent layer 1050 that includes one or more feedback loop 1055. The feedback 1055 may be used to account for relationships of the features in a transaction record or temporal relationships of the dimensions in the transaction record. The layers 1030, 1040, and 1050 may be followed in multiple fully connected layers 1060 that have nodes (represented by squares in FIG. 10) connected to each other. The fully connected layers 1060 may be used for dimension and pattern detection. In one embodiment, one or more custom layers 1070 may also be presented for the generation of a specific format of output 1020. For example, a custom layer may be used for future spending prediction for labeling a transaction record input with different dimension labels.

The order of layers and the number of layers of the CNN 1000 in FIG. 10 is for example only. In various embodiments, a CNN 1000 includes one or more convolutional layer 1030 but may or may not include any pooling layer 1040 or recurrent layer 1050. If a pooling layer 1040 is present, not all convolutional layers 1030 are always followed by a pooling layer 1040. A recurrent layer may also be positioned differently at other locations of the CNN. For each convolutional layer 1030, the sizes of kernels (e.g., 3×3, 5×5, 7×7, etc.) and the numbers of kernels allowed to be learned may be different from other convolutional layers 1030.

A machine learning model may include certain layers, nodes, kernels and/or coefficients. Training of a neural network, such as the CNN 1000, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other transaction records in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing prediction or another suitable task for which the model is trained.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method, comprising:
   serving as a server that manages authorizations on behalf of a domain;
   generating a first set of data through the authorizations, the first set of data comprising authorization records between user accounts of the domain and third-party named entities;
   storing the first set of data as multi-dimensional data that comprises a plurality of dimensions, the plurality of dimensions comprising the user accounts and the third-party named entities as two of the dimensions;
   receiving a second set of data from one or more external data sources;
   causing to display a graphical user interface that visualizes an aggregation of the first set of data and the second set of data as a two-dimensional temporal graph;
   receiving, from the graphical user interface, a filtering selection of the aggregation of data by a first dimension;
   filtering the aggregation of data by the first dimension to generate a first subset of data;
   receiving, from the graphical user interface, a grouping selection to group the first subset of the data by a second dimension, the second dimension of the first subset of data comprising a plurality of second-dimensional values; and
   causing to modify the two-dimensional temporal graph in the graphical user interface, the modified two-dimensional temporal graph comprising accumulative information of the first subset of data that is separated by the plurality of second-dimensional values, each second-dimensional value of the second dimension being associated with a visual element that is distinguishable from other second-dimensional values, and wherein a totality of the visual elements of the plurality of second-dimensional values forms a visual element of the accumulative information in the modified two-dimensional temporal graph.

2. The computer-implemented method of claim 1, further comprising:
   receiving, from the graphical user interface, a time period selection to generate a second subset of data, the second subset of data comprising the first subset of data in the selected time period; and
   displaying, in the graphical user interface, the two-dimensional temporal graph comprising accumulative information of the second subset of data.

3. The computer-implemented method of claim 2, wherein the second subset of data further comprises the first subset of data in a second time period prior to the selected time period.

4. The computer-implemented method of claim 3, further comprising:
   receiving, from the graphical user interface, a selection of a second-dimensional value; and
   displaying, in the graphical user interface, the two-dimensional temporal graph comprising information of the second subset of data having the selected second dimensional-value in the selected time period and the second time period.

5. The computer-implemented method of claim 2, further comprising:
   applying a model to the first subset of data to predict accumulative information of the first subset of data in an upcoming time period; and
   displaying, in the graphical user interface, the two-dimensional temporal graph comprising the predicted accumulative information of the first subset of data.

6. The computer-implemented method of claim 2, wherein the selected time period is a week, a month, or a year.

7. The computer-implemented method of claim 1, further comprising:
   receiving, from the graphical user interface, a second filtering selection of the aggregation of data by a third dimension;
   filtering the aggregation of data by the first dimension and the third dimension to generate a second subset of data; and
   displaying, in the graphical user interface, the two-dimensional temporal graph comprising accumulative information of the second subset of data.

8. The computer-implemented method of claim 1, further comprising:
   receiving, from the graphical user interface, a user interaction to select a time point on the two-dimensional temporal graph; and
   displaying a graphical element in the graphical user interface, the graphical element comprising information of the first subset of data for each second-dimensional value at the selected time point.

9. The computer-implemented method of claim 1, wherein the plurality of dimensions further includes one or more of: vendor, cardholder, category, department, location, and payment type.

10. The computer-implemented method of claim 1, wherein the aggregation of data comprises transaction amounts associated with one or more of the dimensions.

11. The computer-implemented method of claim 10, further comprising:
ranking, the first subset of data based on the transaction amounts associated with a third dimension, the third dimension of the first subset of data comprising a plurality of third-dimensional values; and
causing to display in the graphical user interface, the ranked subset of data.

12. The computer-implemented method of claim 10, further comprising:
setting a threshold for a transaction amount in a third dimension, the third dimension of the subset of data comprising a plurality of third-dimensional values; and
in response to a transaction amount associated with a third-dimensional value exceeding the threshold, causing to send a notification to a user device to inform the user about the transaction amount associated with the third-dimensional value.

13. A system comprising:
a graphical user interface configured to display a two-dimensional temporal graph; and
a computing server in communication with the graphical user interface, the computing server comprising a processor and memory, the memory configured to store a set of code instructions, the set of code instructions, when executed by the processor, causes the processor to:
serve as a server that manages authorizations on behalf of a domain;
generate a first set of data through the authorizations, the first set of data comprising authorization records between user accounts of the domain and third-party named entities;
store the first set of data as multi-dimensional data that comprises a plurality of dimensions, the plurality of dimensions comprising the user accounts and the third-party named entities as two of the dimensions;
receive a second set of data from one or more external data sources;
cause the graphical user interface to display the two-dimensional temporal graph that visualizes an aggregation of the first set of data and the second set of data;
receive, from the graphical user interface, a filtering selection of the aggregation of data by a first dimension;
filter the aggregation of data by the first dimension to generate a first subset of data;
receive, from the graphical user interface, a grouping selection to group the first subset of the data by a second dimension, the second dimension of the first subset of data comprising a plurality of second-dimensional values; and
cause the graphical user interface to modify the two-dimensional temporal comprising accumulative information of the first subset of data that is separated by the plurality of second-dimensional values, each second-dimensional value of the second dimension being associated with a visual element that is distinguishable from other second-dimensional values, and wherein a totality of the visual elements of the plurality of second-dimensional values forms a visual element of the accumulative information in the modified two-dimensional temporal graph.

14. The system of claim 13, wherein the set of code instructions further causes the processor to:
receive, from the graphical user interface, a time period selection to generate a second subset of data, the second subset of data comprising the first subset of data in the selected time period; and
cause the graphical user interface to display the two-dimensional temporal graph comprising accumulative information of the second subset of data.

15. The system of claim 14, wherein the second subset of data further comprises the first subset of data in a second time period prior to the selected time period.

16. The system of claim 15, wherein the set of code instructions further causes the processor to:
receive, from the graphical user interface, a selection of a second-dimensional value; and
cause the graphical user interface to display the two-dimensional temporal graph comprising information of the second subset of data having the selected second dimensional-value in the selected time period and the second time period.

17. The system of claim 14, wherein the set of code instructions further causes the processor to:
apply a model to the first subset of data to predict accumulative information of the first subset of data in an upcoming time period; and
cause the graphical user interface to display the two-dimensional temporal graph comprising the predicted accumulative information of the first subset of data.

18. The system of claim 13, wherein the set of code instructions further causes the processor to:
receive, from the graphical user interface, a second filtering selection of the aggregation of data by a third dimension;
filter the aggregation of data by the first dimension and the third dimension to generate a second subset of data; and
cause the graphical user interface to display the two-dimensional temporal graph comprising accumulative information of the second subset of data.

19. The system of claim 13, wherein the set of code instructions further causes the processor to:
receive, from the graphical user interface, a user interaction to select a time point on the two-dimensional temporal graph; and
cause the graphical user interface to display a graphical element comprising information of the first subset of data for each second-dimensional value at the selected time point.

20. The system of claim 13, wherein the aggregation of data comprises transaction amounts associated with one or more of the dimensions, and the set of code instructions further causes the processor to:
rank, the first subset of data based on the transaction amounts associated with a third dimension, the third dimension of the first subset of data comprising a plurality of third-dimensional values; and
cause the graphical user interface to display the ranked subset of data.

* * * * *